US008444927B2

(12) United States Patent
King et al.

(10) Patent No.: US 8,444,927 B2
(45) Date of Patent: May 21, 2013

(54) CARTRIDGE-TYPE DISPENSER

(75) Inventors: Christopher King, Hampton, NJ (US); Jay Packman, Suffern, NY (US)

(73) Assignee: Reckitt Benckiser LLC, Parsippany, NJ (US)

( * ) Notice: Subject to any disclaimer, the term of this patent is extended or adjusted under 35 U.S.C. 154(b) by 659 days.

(21) Appl. No.: 12/305,663

(22) PCT Filed: Jun. 12, 2007

(86) PCT No.: PCT/GB2007/002161
§ 371 (c)(1),
(2), (4) Date: Jun. 1, 2010

(87) PCT Pub. No.: WO2008/001042
PCT Pub. Date: Jan. 3, 2008

(65) Prior Publication Data

US 2011/0194993 A9 Aug. 11, 2011

Related U.S. Application Data

(60) Provisional application No. 60/806,285, filed on Jun. 30, 2006.

(51) Int. Cl.
*B01D 11/02* (2006.01)

(52) U.S. Cl.
USPC .......................................... 422/261; 222/207

(58) Field of Classification Search
USPC ............ 422/261, 430, 547, 552, 569; 53/410, 53/423; 222/164, 165, 207
See application file for complete search history.

(56) References Cited

U.S. PATENT DOCUMENTS

| | | | | |
|---|---|---|---|---|
| 4,444,730 | A * | 4/1984 | Renders et al. | 422/264 |
| 4,450,594 | A | 5/1984 | Hotchkin | |
| 2004/0068781 | A1 | 4/2004 | Hill | |
| 2004/0099562 | A1 | 5/2004 | Vazquez | |
| 2004/0195248 | A1 * | 10/2004 | Garcia | 220/570 |
| 2005/0008552 | A1 | 1/2005 | Marine | |

FOREIGN PATENT DOCUMENTS

| | | | |
|---|---|---|---|
| EP | 0217595 | A | 4/1987 |
| EP | 0324642 | A1 | 7/1989 |

* cited by examiner

*Primary Examiner* — Sean E Conley
(74) *Attorney, Agent, or Firm* — Norris McLaughlin & Marcus PA

(57) ABSTRACT

The present invention relates to improved cartridge-type dispenser for a chemical treatment composition which, when contacted with water or other liquid will at least partially dissolve or disperse, and thereby elute one or more chemical compounds to the water or other liquid. The improved cartridge-type dispense may be used itself, or in conjunction with a further apparatus.

5 Claims, 16 Drawing Sheets

CARTRIDGE-TYPE DISPENSER

Figure 1:
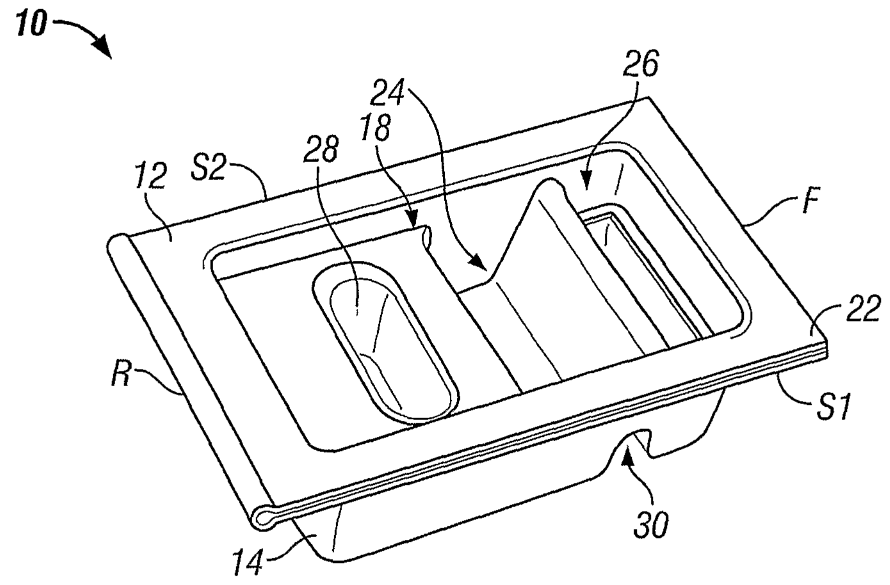

This is an application filed under 35 USC 371 of PCT/GB2007/002161.

The present invention relates a cartridge-type dispenser for a dispersible or soluble material.

Delivery of a dispersible or soluble material from cartridges are known in the art. Such include for example tray-type modules containing a fragrance composition, particularly in a gelled form which is intended to be inserted into an air freshener-type device. In use, the air freshener-type device operates to heat the contents of the fragrance composition in order to dissipate it into the air. With respect to compositions which can be dispensed to a liquid or a fluid stream, such as a liquid stream, such devices are also generally known. For example, many known-art in the bowl ITB toilet treatment devices include an exterior housing having one or more passages therethrough, and contained within the housing is a quantity of a chemical treatment composition typically in the form of a gel, but most frequently in the form of a compressed block. The chemical composition is intended to be dispensed when flush water from the toilet, which is applied during the normal flush cycle of a toilet, washes over the housing and partially through the housing wherein it contacts the chemical composition. This quantity of water contacting the chemical composition dissolves or disperses a part thereof, to form a treatment liquor which then exits the housing and is delivered to the toilet bowl. Other articles comprising a housing which encases a chemical treatment composition are also generally known to the art.

Use of a cartridge-type device in order to supply a chemical treatment composition provides a number of important technical advantages. First, the chemical treatment composition may pose a risk of hazard to a consumer or a user, particularly if coming into direct contact with said chemical treatment composition. Use of such a cartridge then affords a degree of safety in that the cartridge provides a physical barrier denying contact between a consumer and the chemical treatment composition itself. Additionally, the use of a cartridge-type dispenser for a chemical treatment composition poses the advantage in that it may form a sub-unit or a module of a larger apparatus which is used to provide or to dispense a chemical treatment composition for a particular application. Rather than requiring the disposal of the complete device or unit, once the chemical treatment composition is exhausted then a simple replacement of the cartridge-type dispenser with a fresh dispenser containing a new quantity of a chemical treatment composition is all that is normally required. Such is particularly cost-effective and also reduces the unnecessary wastage of materials. A further advantage of the use of a cartridge-type dispenser for delivering a chemical composition is that the configuration or form of the cartridge-type dispenser can be produced such that it provides a degree of an anti-counterfeiting protection against misuse of the cartridge and/or the device within which the cartridge-type dispenser is used. For example, the housing of the cartridge can be modified or constructed in such a manner that it ensures that only a genuine replacement cartridge is insertable within an apparatus or device used for dispensing the chemical treatment composition. Additionally, the housing or the cartridge can be modified or constructed in such a manner that it also ensures that it is properly inserted and/or conjoined with a larger apparatus or device. The latter affords an additional degree of product safety where there may be a risk posed should the cartridge-type dispenser be improperly inserted or conjoined in the apparatus with which it is intended to be used. Thus, significant technical and a number of safety advantages are made possible upon the use of cartridge-type dispensers for the delivery of chemical treatment compositions.

Notwithstanding the large number of known cartridge-type dispensers used for the delivery of a chemical treatment composition, there is nevertheless a real and continuing need to provide still further improved cartridge-type dispensers to the relevant art.

In a first aspect the present invention is directed to an improved cartridge-type dispenser for a chemical treatment composition, e.g., in the form of a gel, tablet or block, which is useful in eluting one or more chemical compounds therefrom via dissolution or dispersion when contacted with water or other liquid into said water or other liquid to form a liquid treatment composition therefrom.

In a second aspect of the invention there is provided an improved cartridge-type dispenser wherein the chemical treatment composition is a solid composition or a gel composition which is at least partially dissolvable or dispersible in water.

In a third aspect of the invention there is provided an improved cartridge-type dispenser wherein the chemical treatment composition is a solid composition or a gel composition which is at least partially dissolvable or dispersible in a non-aqueous liquid, such as one or more organic solvents.

In a fourth aspect of the invention there is provided an improved cartridge-type dispenser wherein the chemical treatment composition is a solid composition or a gel composition which is at least partially dissolvable or dispersible in a blended aqueous/non-aqueous liquid, such as one or more organic solvents dissolved or dispersed in water.

In a fifth aspect of the invention there is provided an improved cartridge-type dispenser according to any of the first through fourth aspects of the invention wherein the chemical treatment composition is used to provide a sanitizing composition to the water or other liquid exiting said dispenser.

In a sixth aspect of the invention there is provided an improved cartridge-type dispenser according to any of the first through fourth aspects of the invention wherein the chemical treatment composition is used to provide a cleaning composition to the water or other liquid exiting said dispenser.

In a seventh aspect of the invention there is provided a treatment device which is adapted to operate in conjunction with an improved cartridge-type dispenser according to any of the first through fourth aspects of the invention.

According to an eighth aspect of the invention there is provided a process for treating water or other liquid which process contemplates the steps of:

supplying an improved cartridge-type dispenser according to any of the first through fourth aspects of the invention, supplying a quantity of water or other liquid to the said dispenser in order to cause the dissolution or dispersion of at least a part of the chemical treatment composition contained within said dispenser and to form a liquid treatment composition.

According to a ninth aspect of the invention there is provided a process for producing a treated liquid composition which comprises the steps of:

providing a treatment device which is adapted to operate in conjunction with an improved cartridge-type dispenser according to any of the first through fourth aspects of the invention;

supplying an improved cartridge-type dispenser according to any of the first through fourth aspects of the invention to the treatment device;

supplying a quantity of water or other liquid to the treatment device and to said dispenser in order to cause the dissolution or dispersion of at least a part of the chemical treatment composition contained within said dispenser and to form a liquid treatment composition.

These and other aspects of the invention will be better understood from a review of the following detailed description and accompanying figures.

It is believed that certain aspects of the present invention will be better understood from the following description of preferred embodiments, taken in conjunction with the accompanying drawings, in which like reference numerals identify identical elements.

FIG. 1 depicts a cartridge-type dispenser 10 according to a preferred embodiment of the invention the cartridge-type dispenser includes a top 12, a bottom 14, which are joined by a hinge 16. The dispenser 10 had a front "F", a rear "R", a first side S1 and opposite therefrom a second side S2. As can be seen from FIG. 1, the dispenser includes an upper cavity 18 which is bounded by a flange 22 which defines a flat frame surface. As is further visible from this figure, the upper cavity 18 contains a supply weir 24 as well as an overflow weir 26. Also visible is the retention post 28 which extends downward into the bottom part 14 and which will be described with further detail thereafter. Also visible within FIG. 1, is one end of the dike 30 which is in this embodiment, integrally formed with the bottom part 14 of the dispenser 10.

Figure 2:
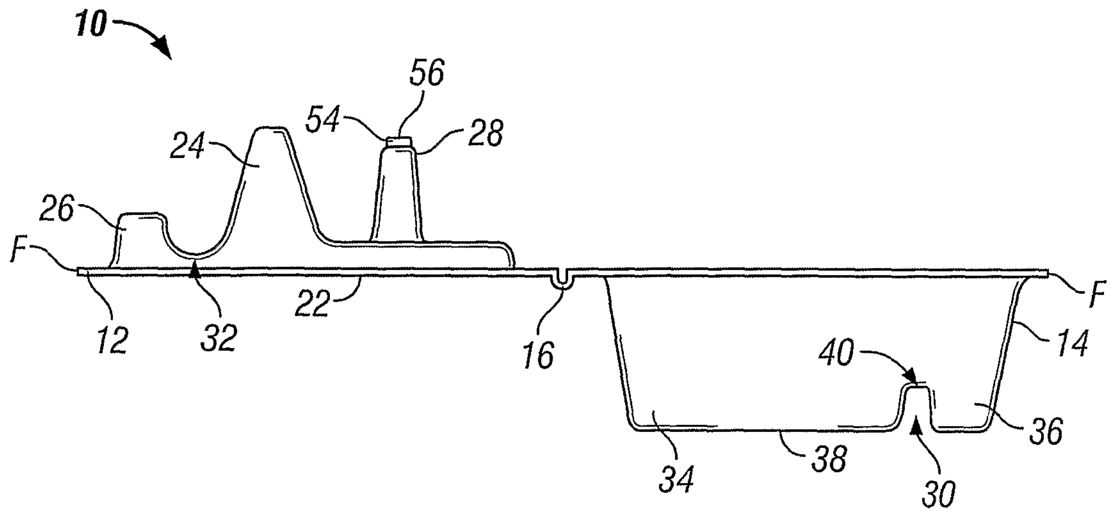

FIG. 2 depicts in a side plan view the cartridge-type dispenser of FIG. 1 in an unfolded or opened configuration. The dispenser 10 is herein depicted opened about the hinge 16 such that the details of elements of the top part 12 are illustrated more clearly. As can be seen, extending downwardly (when in a closed configuration), but here shown as extending upwardly in this open configuration are the supply weir 24, the overflow weir 26 as well as the retention post 28. The specific functions of these elements of the cartridge-type dispenser 10 will be described hereinafter. It is sufficient to note however that a portion of the supply weir is joined by virtue of an overflow channel 32 which provides fluid communication between the supply weir 24 and the overflow weir 26 when the cartridge-type dispenser 10 is closed as depicted in FIG. 1. It is further important to note that with regard to FIG. 2, that the dike 30 extends across the bottom part 14 of the cartridge-type dispenser 10 and divides the bottom part 14 into two separate sections, a trough section 34 and an exit section 36. As it is seen in this embodiment, as the base 38 of the bottom part 14 is essentially flat it is readily conceived that the height of the dike, that is, to say the distance between the crest 40 of the dike 30 and the base 38 may be used in controlling the amount of a liquid, e.g. water or other liquid, within the bottom part 14 and within the trough 34. Thus, variation in the height of the dike, by either increasing or decreasing the distance between its crest 40 and the bottom 38 may be used to limit the depth of the liquid contained within the trough 34.

Figure 3:
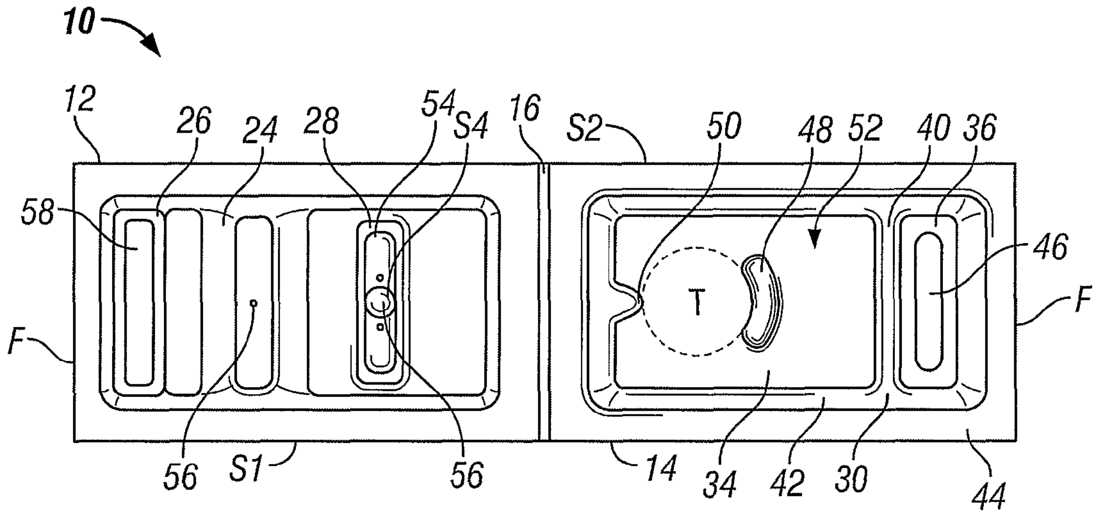

Turning now to FIG. 3, there is depicted a plan view of the opened or unfolded cartridge-type dispenser 10 as depicted in FIGS. 1 and 2. Various features of the foregoing figures are more clearly defined from FIG. 3. Turning first to the bottom part 14 of the dispenser 10, the dike 30 and its upper-most part thereof namely its crest 40 can be seen to divide the trough 34 from the exit section 36. As is clearly visible, the trough 34, the exit section 36 and indeed the dike 30 are all formed within a recess 42 which extends downwardly from a bottom flange 44 which extends around this recess 42, and which bottom flange 44 defines the top-most part of the bottom part 14. With regard first to the exit section 36 which is positioned towards the front of the cartridge 10, the exit weir contains within a through perforation or exit 46. The through perforation, although not visible in either FIG. 1 or 2, is to be understood as being a perforation, or for that matter may be a plurality of perforations (as depicted in later figures and embodiments), which permits for the egress of water or other liquid to exit from within the interior of the cartridge 10. Thus, this exit 46 acts as the fluid or liquid outlet for the cartridge-type dispenser 10. Now moving away from the front of the cartridge 10, intermediate the exit section 36 and the trough 34 is the dike 30. As will be readily understood from conjointly viewing FIGS. 2 and 3, the dike acts to provide a liquid dam between the exit section 36 and the trough 34; liquid contained within the trough 34 must necessarily overcome or flow over the crest 40 of the dike 30 in order to enter the exit section 36 and thence exit the cartridge-type dispenser 10 by flowing outwardly through the exit 46. Depicted in dotted line and within the bottom of the trough 34 is a tablet "T". The tablet is representative of a chemical treatment composition which can be a solid, gel, semi-solid, paste, or for that matter any material which is at least partially dissolvable or dispersible in the liquid which is introduced into the trough 34. For the sake of convenient reference, a generally short cylindrical tablet "T" is depicted. The tablet is retained in its position by being lodged or located between a retention wall 48 on one side and by a retention pin 50 approximately perpendicularly across from the retention wall 48. Both of these latter elements may be integrally formed as part of the dispenser 10, but it is to be understood that one or both of these may be omitted. The provision of such elements is however convenient in instances wherein the form of the chemical treatment composition has a surface area which is less than the surface area of the bottom 38 of the trough 34 and/or in order to prevent it sliding or being dislodged during the use of the cartridge-type dispenser 10. Providing such elements, or other elements, may be utilized in order to retain the chemical treatment composition in a specific region or location of the trough 34.

It is also to be noted that there is provided an inlet zone 52 which is a portion of the trough 34 which is adapted to receive a portion of the supply weir 24 when the cartridge-type device is assembled into the closed configuration according to FIG. 1. In this preferred embodiment, the supply weir 24 extends downwardly and into the interior of the bottom part 14 of the dispenser 10. In such an arrangement, it is foreseen that the retention wall 48 may be eliminated and rather, the position of the supply weir 24 may also be used, or be used in place of the retention wall 48 in retaining a tablet within the weir 34.

Moving yet further away from the front of the cartridge-type dispenser 10 of FIG. 3, it is seen that the top part 12 and the bottom part 14 are joined by an intermediate hinge 16. Although such a hinge is not necessary and the top part and the bottom part may be joined by simply layering the top part upon the bottom part in register, and thereafter sealing or otherwise joining the top part to the bottom part, the use of a hinge is particularly convenient in that it permits for the manufacture of the cartridge-type dispenser 10 in a single mold. Additionally, the use of a hinge particularly such as that depicted which runs along the edge of both the top part and the bottom part also ensures very consistent and reliable alignment of the top part 12 to the bottom part 14 when these two parts are closed to form the configuration as depicted in FIG. 1. Such reduces operator error, and/or machine error which may be used to perform this function.

FIG. 3 illustrates the retention pin 54 which, is integrally formed with the retention post 28 of the top part 12 of the dispenser 10. As is more clearly understood with relation to FIG. 2, the height, that is to say the distance between the top flange 22 and the base 56 of the retention pin 54 may be suitably dimensioned such that, when the device 10 is in a closed-type configuration according to FIG. 1, the distance between the base 56 and the interior of the base 38 of the trough 34 is suitable to accommodate within this space a tablet T. While not an essential feature of the invention, according to preferred embodiment and wherein a tablet is supplied and used with the cartridge-type dispenser 10, a retention post 28 is necessarily present in order to ensure that the tablet (or other chemical treatment composition) is retained within the trough such that at least a portion of the tablet is in contact with liquid which is present within the trough 34. The retention post 28 need not however include a retention pin 54, although such is conveniently present. Advantageously, when the cartridge-type dispenser 10 is in a closed configuration according to FIG. 1, the height of the retention post 28 is sufficiently great such that the height between the bottom 38 of the trough 34 and the crest 40 of the dike 30 is greater than or approximately equal to the height between the bottom 38 of the dike 34 and the bottom of the supply weir 24. In this manner, when liquid is present in the trough 34, and preferably when sufficient liquid is in the trough 34 such that its level extends upwardly from the base 38 to the crest 40, most, or all of the tablet T is immersed within the liquid present within the trough 34.

Moving yet further away from the front F of the FIG. 3, there is next encountered the supply weir 24, which includes a supply hole 56. The supply hole is understood to be a through hole, such that any liquid which collects within the supply weir 24 when the cartridge is in the configuration according to FIG. 1, said liquid will enter, or drain from the exterior, into supply weir 26 and through the supply hole 56 and flow into the interior of the trough 34. In the particular embodiment depicted in FIG. 3, a single supply hole 56 is illustrated however, it is to be understood that a plurality of holes, a slot, a mesh, or any other type of orifice or passage may be utilized to permit for the entry of liquid supplied from the exterior into the supply weir to pass through said supply hole 56 and into the interior of the cartridge-type dispenser 10.

It will be understood that the dimensions as well as the number of the supply hole(s) 56 plays an important role in the operation of the cartridge-type dispenser 10. Namely, wherein the cartridge-type dispenser 10 is used in atmospheric pressure, that is to say in a non-pressurized environment, the simple force of gravity will be primarily responsible for ensuring fluid flow from the exterior and into the interior of the device 10. Variation in the size, and/or the number of the orifices passing through from the bottom of the supply weir 26 and into the interior of the device also has a direct relationship upon the fluid flow rate which is permitted to enter the trough 34 and to come into contact with the Tablet. Thus, where a slow flow rate is desired, the use of a very small and/or a very small number of orifices having reduced dimensions will limit the input rate of liquid entering the trough 34 via the supply weir 26. Conversely, when a greater rate of liquid is desired to be introduced into the interior of the cartridge-type dispenser 10, then one or more orifices or passages of a larger dimension which provide less resistance to fluid flow from the supply weir 24 and into the trough 34 of the device 10 may be used. What is to be considered an optimal flow rate will of course vary widely depending upon the conditions, as well as the relative dimensions of the cartridge-type dispenser, the solubility of, the quantity of, and even the geometric configuration of the chemical treatment composition present within the trough. Such factors need to be taken into consideration; variation in some of these physical parameters of the cartridge-type dispenser 10 can be adjusted however to meet a wide variety of operating conditions.

Moving still further away from the front of the cartridge-type dispenser 10, there is next encountered the overflow weir 26 which terminates in an overflow exit 58. The overflow exit 58 is positioned at the bottom of the overflow weir 26 and is a through hole or a through passage which permits for the egress of liquid which may be supplied to the upper cavity 18 or the supply weir 24 or both. As can be seen from a view of FIG. 2 as well as FIG. 3, when the cartridge-type dispenser 10 is in a closed configuration as per FIG. 1, it is seen that the overflow exit 58 is positioned above the exit section 36 and its corresponding exit 46.

With regard now to FIG. 1 and FIG. 2, as had been noted previously a overflow channel 32 provides fluid communication between the supply weir 24 and the overflow weir 26. As is best understood with respect the FIG. 1, wherein a supply of a liquid is introduced into the upper cavity 18 at a rate which exceeds the normal inlet rate of the supply weir 24 and the supply hole 56, then any excess liquid then flows through the channel 32 and into the exit weir 26. Such excess liquid then exits through the outlet 58 which flows directly downwardly into the exit 46 and then outward from the cartridge-type dispenser 10 of the invention. It is further significant to point out that such excess liquid which exceeds the capacity of the supply weir 26 and its supply 56, is permitted to exit through the overflow weir in the manner just described and the quantity of excess liquid never contacts the quantity of liquid within the trough 34 and contact with the Tablet and thus does not further dilute the chemical treatment composition formed by the quantity of liquid contacting the tablet T. Additionally also, as the top part 12 and the bottom part 14 are sealed at their respective flanges 22, 44 and most desirably provide a liquid-tight seal at this junction, even larger amounts of liquid when supplied to the upper cavity 18, even when supplied in an amount in excess of the normal capacity of the overflow weir 26 merely flow over the flanges 22 and do not enter the interior trough 34 of the cartridge-type dispenser 10.

The operation of the cartridge-type dispenser 10 will be described in more detail with regard to FIGS. 4, 5, 6 and 7.

Figure 4:
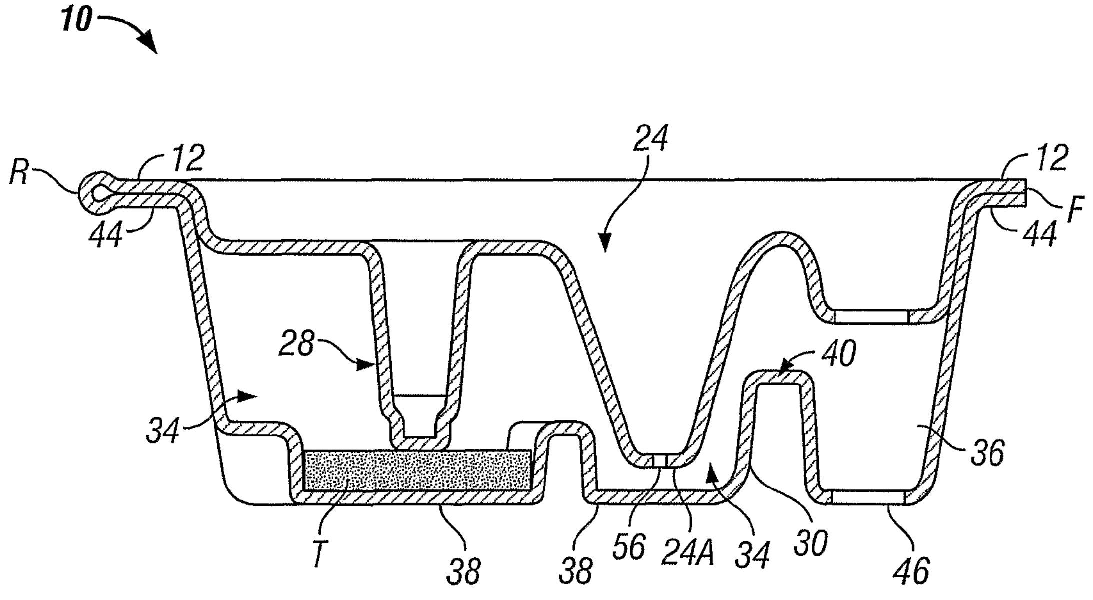

FIG. 4 depicts a cartridge-type dispenser 10 prior to the introduction of any liquid to its interior. As can be seen, the tablet T is retained against the base 38 of the trough 34 by means of the retention post 28. Moving in the direction of the front F is next seen the supply weir 24 whose base 24A includes a supply hole 56 at the lowest part thereof. The portion of the supply weir 24 which includes the supply hole 56 is also positioned within the trough 34 of the cartridge-type dispenser 10. As can be seen readily from the figure, the distance from the base 24A of the supply weir 24 to the base 38 of the trough 24 is less than the distance between the crest 40 of the dike 30 which separates the trough 34 from the exit section 36 and the exit 46 located at the bottom of the exit section 36. Also seen is the correspondence between the top flange 22 and the bottom flange 44 which are layered in register to each other and are understood to form a liquid tight seal there between.

Figure 5:
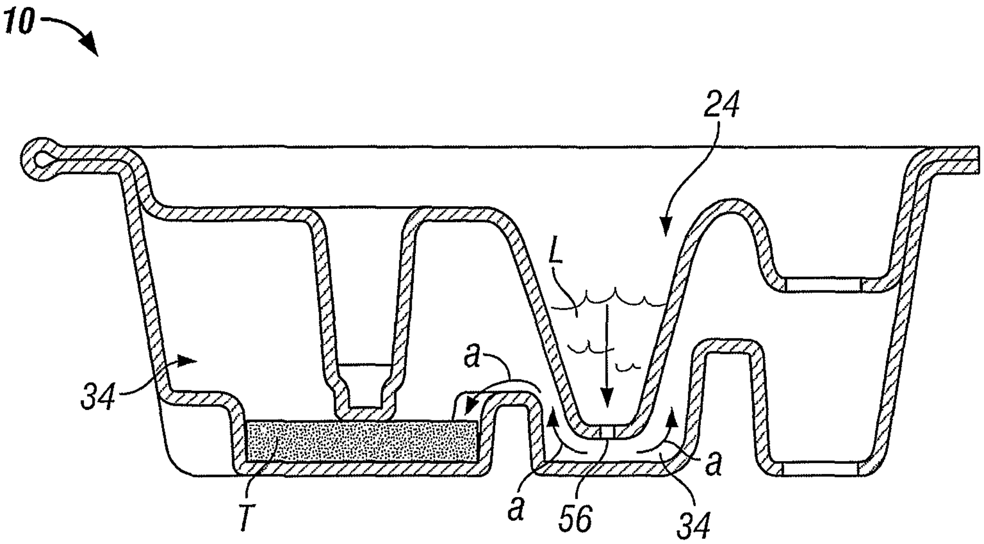

Turning now to FIG. 5, the operation of the cartridge-type dispenser 10 upon the introduction of initial amounts of a liquid L is more readily described. As is thereon seen, the liquid "L" is introduced into the supply weir 24 wherein, it flows through the supply hole 56 and into the interior of the trough 34. The direction of fluid flows indicated by the arrows "a". As is seen and as is readily understood from an examination of the figures, the head pressure of the liquid L in the supply weir 24 forces the liquid passing downwardly through the supply hole 56 to fill up the trough 34. During this operation, the liquid comes into contact with the tablet T.

Figure 6:
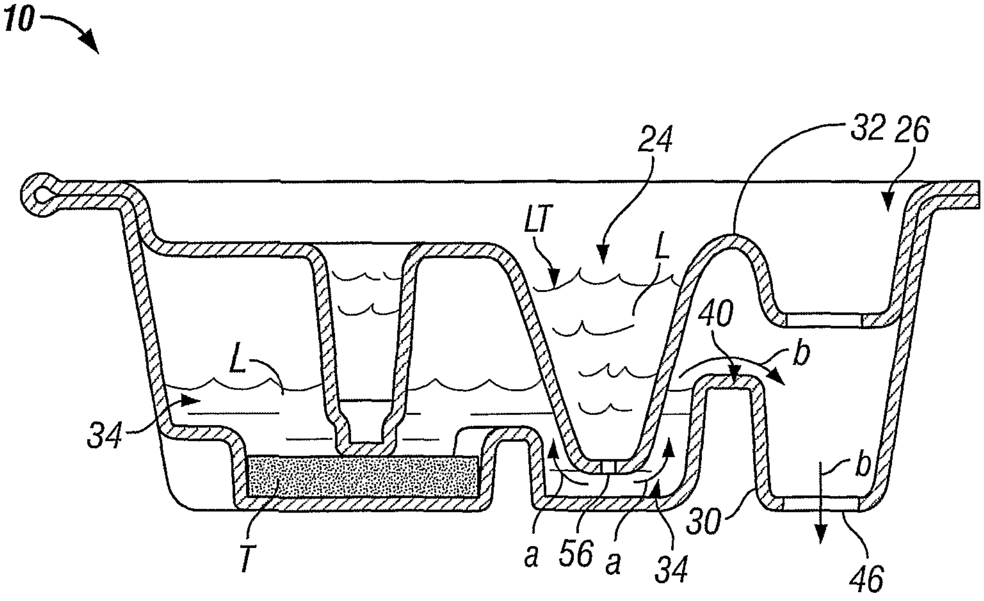

Turning now to FIG. 6, there is depicted a further embodiment of the cartridge-type dispenser 10 depicted in part in FIGS. 4 and 5 however illustrating a "steady-state" operational status. As is seen therein, a sufficient supply of liquid L is supplied to the supply weir 24 such that the top level "LT" of the liquid is at a point above the level of the crest 40 of the dike 30 yet is not sufficiently high to enter the channel 32 and exit via the overflow weir 26. As can be seen, the liquid level ensures that there is a sufficiently high level of liquid within the trough 34 such that a supply of liquid enters into the trough 34 from the supply weir via the supply hole 56, at least part of which comes into contact with the tablet T while concurrently a portion of the liquid L within the trough 34 exits the trough 34 by overflowing the crest 40 of the dike 30 and exiting the cartridge-type dispenser via the exit 46. As will be readily understood, the maintenance of approximately, but preferably a uniform quantity of a liquid within the supply weir 24 as illustrated ensures that an approximately constant mass of liquid enters, and exits the trough 34 in the manner described. This liquid L within the trough 34 coming into contact with the tablet T ensures that a part is dissolved, or dispersed, or otherwise at least are eluted into the liquid forming a treatment liquid composition which exits the cartridge-type dispenser 10 and in the manner described.

Figure 7:
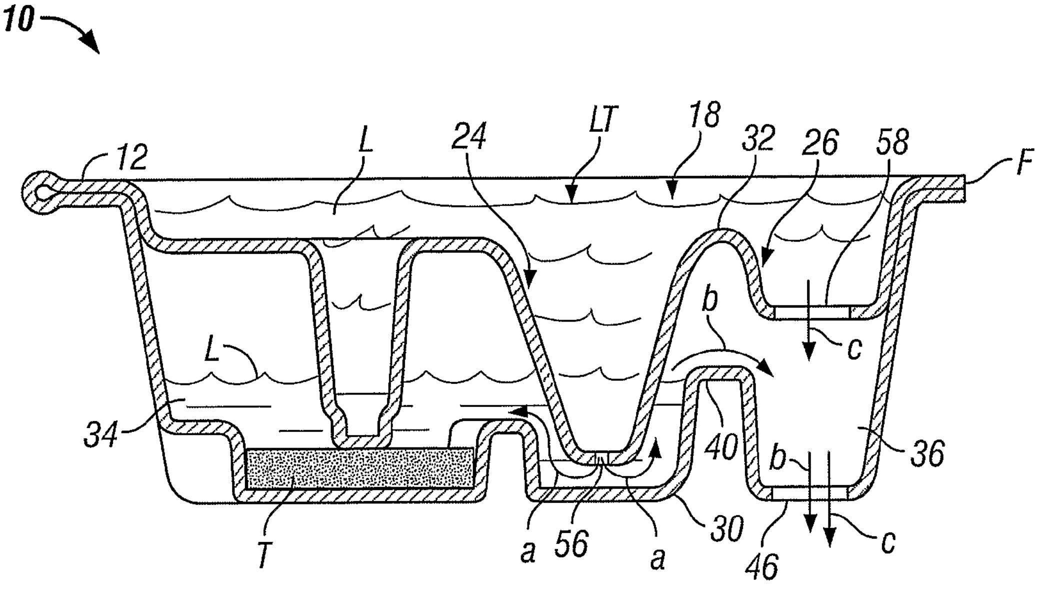

FIG. 7 illustrates a further embodiment of the cartridge-type dispenser 10 illustrated in prior FIGS. 4, 5, and 6 but in this depiction illustrates an excess overflow condition for the liquid L being supplied to the interior of the upper cavity 18 of the cartridge-type dispenser 10. As is visible from FIG. 7, the top of the liquid "LT" is sufficiently high to ensure that the supply weir 24 is overfilled such that a portion of the liquid L flows through the channel 32 and into the overflow weir 26. During such a condition, the liquid enters into the trough 34 via the supply hole 56. As described before with reference to FIGS. 5 and 6, at least part of the liquid L comes into contact with the tablet T before flowing out over the crest 40 of the dike 30 in the direction of flow arrow "b". This liquid, treated by the chemical composition of the tablet T then enters into the exit section 36 and flows outwardly through the exit 46 thereby exiting the cartridge-type dispenser 10. Concurrently, any liquid, as indicated by flow arrows "c", which flows from the upper cavity 18 and through the channel 32 from the supply weir 24 enters the overflow weir 26 and cascades or flows downwardly through the overflow exit 58 wherein it flows into the exit section 36 and continues to flow out of the cartridge-type dispenser 10 via the exit 46. The direction of this flow is indicated by the representation of flow arrow c. As can be seen, under such condition the liquid flow from within the interior of the trough 34 (b) can commingle with any excess liquid (c) to form a combined liquid stream exiting the cartridge-type dispenser 10. Such a flow condition as depicted in FIG. 7 provides two benefits. First, by careful construction of the cartridge-type dispenser 10 and establishing the relative sizes of the various elements, and in particular the volumetric capacity as well as the height of the supply weir 24, this size and/or number of supply holes 56 the supply and volumetric capacity of the trough 34 as well as the position, and size of the dike 30 and its crest 40 with relation to both the trough 34 and the supply weir 24, an optimal or particularly preferred volumetric flow rate be established based upon a constant supply rate of a liquid to the interior of the supply weir 24. Any excess or overflow will result in the conditions identified and depicted on FIG. 7 whereby any excess liquid being supplied to the upper cavity 18 merely flows through the channel 32 downwardly and ultimately out via the exit 46 of the cartridge-type dispenser 10. An alternative, may be desired that controlled dilution of the treatment composition formed by contacting the liquid L coming into contact with the tablet T can also be produced wherein, the dimensions of the elements hereintofore described are established such that while simultaneously ensuring supply of a liquid into the interior of the trough 34 via the supply weir 24 and the supply hole 56, that an excess of liquid always flows via the channel 32 and downwardly where in can commingle with a stream (b) of liquid treatment composition which is diluted by the liquid stream (c) when exiting the cartridge-type dispenser 10.

Furthermore, while not depicted in any of the figures it is to be understood that the cartridge-type dispenser according to the invention may also reliably function even when a vast excess of liquid L is supplied to the upper cavity 18 such that it exceeds the volumetric flow illustrated in FIG. 7. In such condition, while the top level LT overflows the top flange 22, the cartridge-type dispenser 10 will continue to operate as described with respect to FIG. 7, and any further excess liquid L merely flows over the margins of the flange 22 and away from the cartridge-type dispenser 10. Such provides then a "fail-safe" type provision due to a fault in the liquid being supplied to the cartridge-type dispenser, a failure to properly install the cartridge-type dispenser, a misuser mishandling of the cartridge-type dispenser, or the like.

Figure 8:
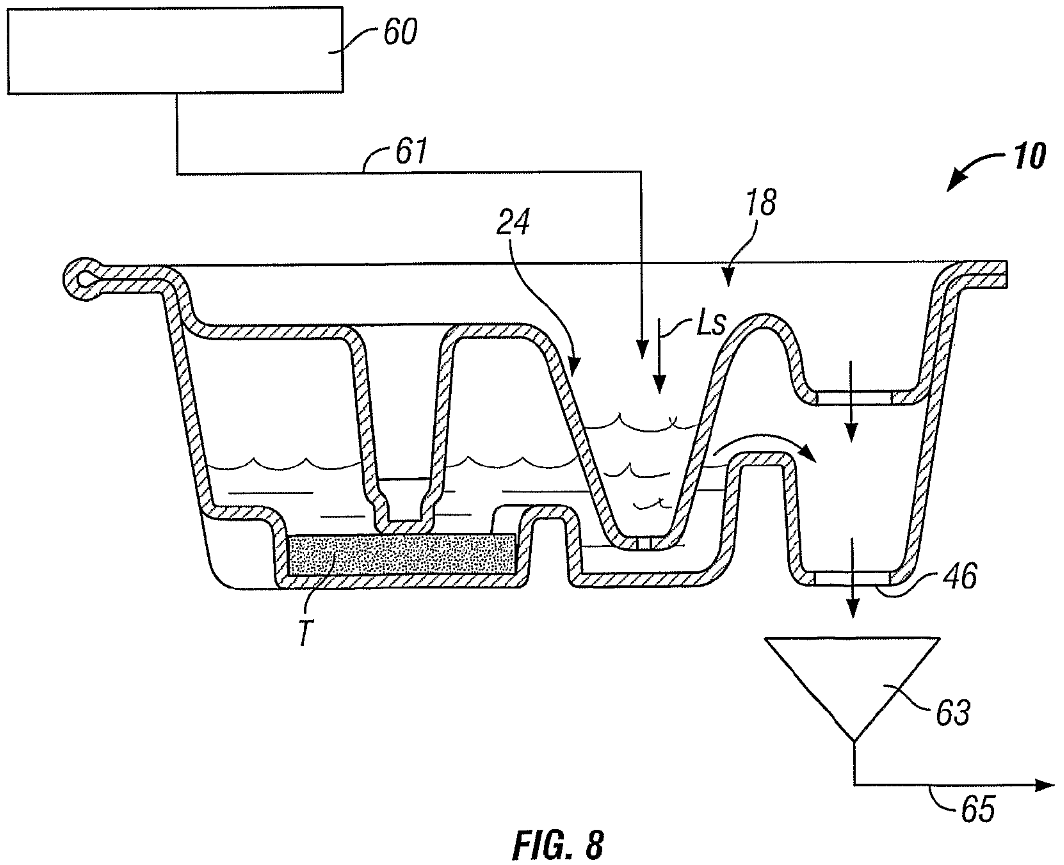

FIG. 8 depicts a schematic embodiment of a device utilizing the cartridge-type dispenser according to the present invention. As is seen on FIG. 8, there provided a supplied liquid "LS" via a conduit 61 from a liquid supply source 60 which is upstream of the cartridge-type dispenser 10. Any conduit, suitable for supplying a suitable quantity of the supplied liquid LS is used to provide a fluid-type connection between the liquid supply and the upper cavity 18 of the cartridge-type dispenser 10. While not depicted it can be understood that any means, or device can be utilized to control the rate of liquid being supplied such as a valve, constricted flow point as part of the conduit and the like which can be at any point intermediate the liquid supply source 60 and the supply weir 24 of the cartridge-type dispenser 10. Such means can be used to control or limit the flow and/or to completely terminate or to initiate the flow of the liquid being supplied LS. Downstream of the cartridge-type dispenser 10 is visible a collection means 63 which is placed downstream of the exit 46 of the cartridge-type dispenser 10. The collection means 63 is used to merely collect the liquid treatment composition exiting the cartridge-type dispenser 10 and to supply it to a suitable liquid conduit 65 which can be used to deliver the liquid treatment composition at a point downstream. Any means, or device to provide these functions can be used and will be readily apparent to one skilled in the art.

Conveniently, the cartridge-type dispenser 10 is used in conjunction with a housing (not shown in FIG. 8) which may include a pair of parallel slots or rails 64 which are dimensioned to suitably receive portions of the top and bottom flanges 22, 44 which extend from at least one, but preferably both opposite sides S1, S2 of the cartridge-type dispenser 10. Thereby, portions of the top and bottom flanges 22, 44 may be conveniently inserted such as by sliding within the corresponding portions of the rails 64 (or slots) which can be used to position, as well as maintain the cartridge-type dispenser in a specific location with respect to a housing and/or a device utilizing the cartridge-type dispenser.

Further variation of the cartridge-type dispenser are described in the following figures and are considered to fall within the scope of the present inventive concept.

Figure 9:
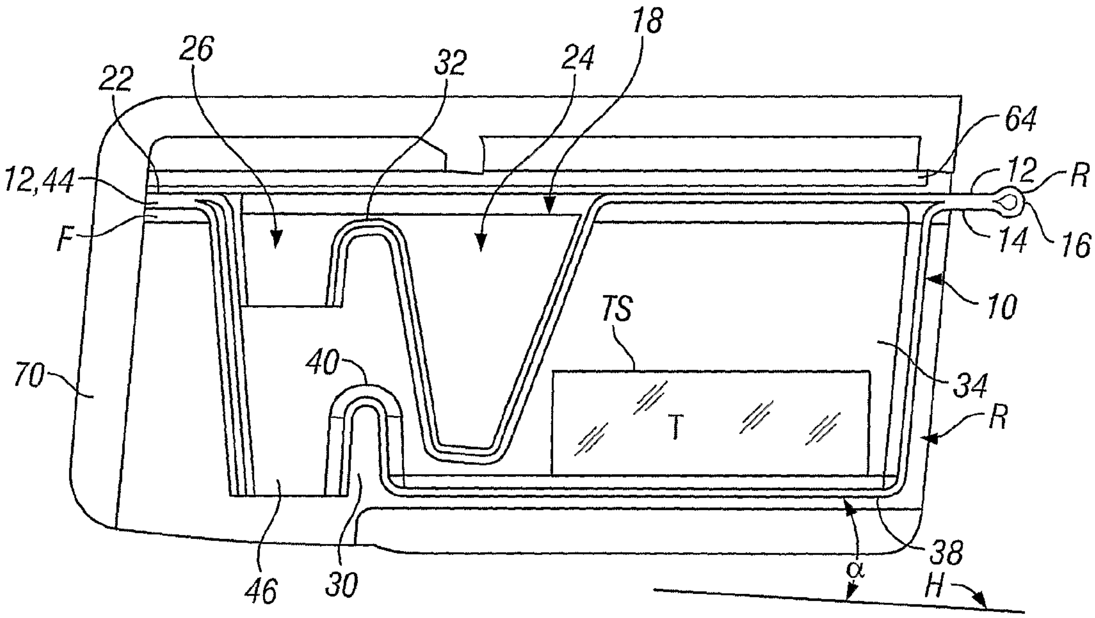

Depicted on FIG. 9 is a further embodiment of a cartridge-type dispenser 10 inserted within a portion of a housing 70 which may form an element of a larger device (not shown). As is seen therein, sides or edges of the top flange 22 and the bottom flange 44 are seen to rest within a slot 64 suitably dimensioned to accommodate these flange portions. As is further visible in FIG. 9, the cartridge-type dispenser 10 is depicted in a cross-sectional view which approximately bisects the cartridge-type dispenser 10 between its front F and its rear R thus permitting a view of the interior arrangements of said cartridge-type dispenser. As is seen, the upper cavity 18 here is comprised only of the supply weir 24 and the overflow weir 26 as connected by intermediate channel 32. In contrast to the prior embodiments illustrated in FIGS. 1-7, there is no additional region which extends beneath the flange 22 towards the interior trough 34 of the cartridge-type dispenser 10. Also visible is a tablet "T" placed within the interior of the trough 34. As can be seen, the tablet T occupies a significant portion of the space rearward of the supply weir 24 and the tablet's upper surface TS is at least higher than the peak of the crest 40 of the dike 30. It is also seen that in this cross-sectional view, that a retention post 28 has been omitted, and similarly, the retention wall 48 and retention pin 50 is also omitted as being unnecessary. As will be readily understood, the size of the tablet T is sufficient in that it is retained behind the supply weir 24 and does not require such additional elements in order to maintain it in its position.

Visible from FIG. 9 is a preferred embodiment of the invention wherein, the positioning of the cartridge-type dispenser 10 is at an incline with respect to a horizontal line, here represented by a line segment "H" such that the base 38 of the trough 34 is angled, as indicated by "$\alpha$" approximately at least 2°, preferably at least 4° and most preferably at least 6° with respect to the horizontal when the cartridge-type dispenser 10 is utilized. Such a slight tilt in the orientation of the cartridge-type dispenser 10 is particularly advantageous in ensuring that fluid flow occurs under non-pressurized conditions. Of course, such is an optional feature and it is to be clearly understood that the cartridge-type dispenser may be used wherein the base of the trough 34 substantially parallel to the horizontal H.

The utilization of a housing depicted on FIG. 9 is a particularly convenient form for the utilization of the cartridge-type dispenser. The pair of slots 64 provide for a very convenient means whereby a user can insert and simultaneously, correctly position the cartridge-type dispenser 10 with respect to the apparatus within which it is used. Further, as is visible from FIG. 9, the location of the hinge is advantageously positioned to extend beyond the margin of the housing 70 whereby it projects and provides a convenient means whereby a user can grasp the cartridge and either insert, or withdraw it without needing to touch further parts of the cartridge-type dispenser 10.

The depiction of FIG. 9 also illustrates a further important embodiment of the invention. Whereas the prior embodiments had illustrated a chemical composition in the form of a tablet having a maximum height dimension with respect to the base 38 which was less than the height of the crest 40 from the base, FIG. 9 depicts the fact that such is not a limitation of the invention but merely a variation. FIG. 9 clearly shows the opposite, namely where the top surface TS of the tablet T is higher than the crest 40 of the dike 30 both being measured with respect to the base 30.

It is also to be understood that whereas a tablet namely in the form of a compacted solid is depicted in this figure, that other solid or semi-solid forms of a chemical composition can be utilized in any of the embodiments of the invention. For example, although not shown in FIG. 9, that the illustrated tablet T can in fact be a further cartridge, cage, container, or other dispenser for a solid, semi-solid or indeed for a liquid composition. For example, it is contemplated that a solid body may be used as depicted in FIG. 9, or alternately a paste or a gel.

Figure 10:
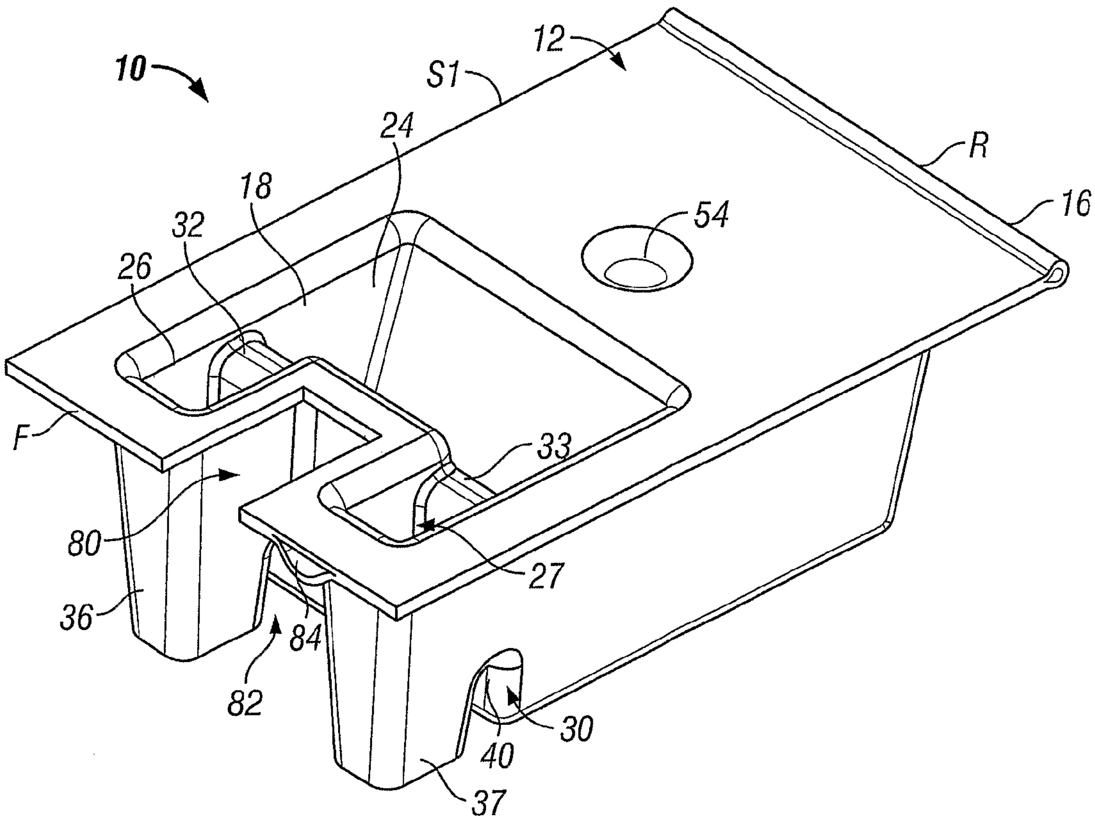

FIG. 10 depicts a second embodiment of a cartridge-type dispenser 10 according to the present invention. This embodiment includes many features common to the embodiment discussed with regard to FIGS. 1-8 yet includes several unique modifications which distinguish it from the first embodiment previously discussed.

As shown on FIG. 10, the cartridge-type dispenser 10 includes an upper 18 which comprises a supply weir 24 and which further comprises two separate overflow weirs, a first overflow weir 26 and a second overflow weir 27. Each of these overflow weirs 26, 27 is connected to the supply weir 24 by a corresponding overflow channel 32, 33. As is very clearly visible from the figure, the first exit weir 26 is spaced apart from the second exit weir 27, both being adjacent to the front F of the cartridge-type dispenser 10, and divided by a recess 80 which extends downwardly from the top 12 and provides for an unencumbered vertical gap 82 between the first exit section 36 and a second exit section 37 which extend downwardly with respect to the top 12. As can be readily understood from the figure, the position of the recess 80 provides for a vertical gap 82 and also acts to functionally divide the single overflow weir 26 and exit section 36 described with reference to FIGS. 1-9 into two similarly functional elements. Otherwise, it will be understood that the operation of the embodiment of the cartridge-type dispenser 10 depicted on FIG. 10 remains essentially the same as previously described albeit with the additional function provided by the recess 80. Also depicted on FIG. 10 is a vent channel 84 which is positioned intermediate the top part 12 and the bottom part 14 of the cartridge-type dispenser and provides for air/liquid communication from the exterior of the cartridge-type dispenser 10, and the interior of the exit section 37.

Figure 11:
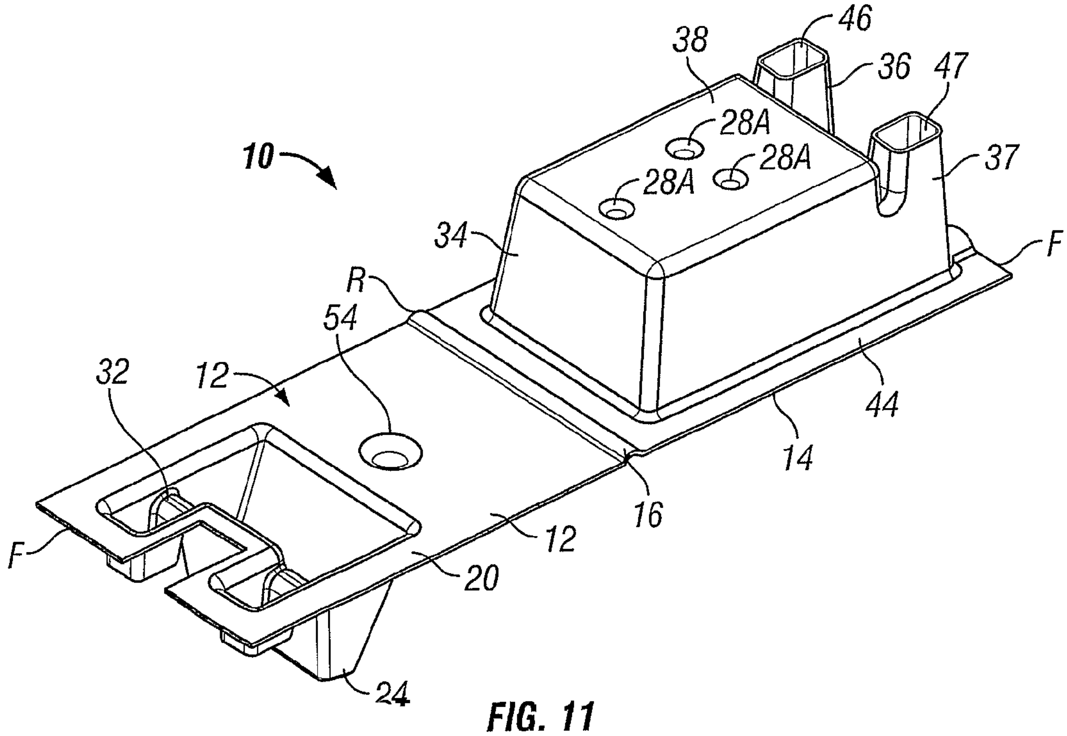

Turning now to FIG. 11, there is depicted in an unfolded configuration the second embodiment of the cartridge-type dispenser 10 described with reference to FIG. 10. As is readily visible thereon, there is provided a retention post 28 extending downwardly from the top part 12 and extending inwardly into the interior of the trough 34 from the base 38 are three retention posts 28A which are spaced apart from one another. While not clearly depicted in FIG. 10 or FIG. 11, it is to be understood that the relative position of the retention posts 28 are suitably dimensioned to accept and to retain therebetween a suitably configured tablet T. Further visible from the figure are the exit 46 located at the bottom of the exit section 36 as well as the exit 47 located at the bottom of exit section 37. Again, as described with references to prior figures, the exits 46, 47 permit for the egress of any liquids exiting the cartridge-type dispenser to pass out through said exits 46, 47 and to continue to any point downstream of the cartridge-type dispenser 10. Additionally, a hinge 16 is also visible joining the top part 12 and the bottom part 14 of the cartridge-type dispenser 10. When assembled, as depicted in FIG. 10, corresponding portions, namely the top flange 22 is layered in register with the bottom flange 44 of the bottom part 14. Advantageously, a liquid tight seal is formed at or between the surfaces of these flanges 22, 44. Again, as described with reference to FIG. 1-3, the utilization of a hinge 16 adjoining the adjacent rearward edges of the top part 12 with the bottom part 14 provides for a convenient and generally reliable means for folding and positioning the top part with respect to the bottom part prior to, and/or during assembly of the cartridge-type dispenser 10.

Figure 12:
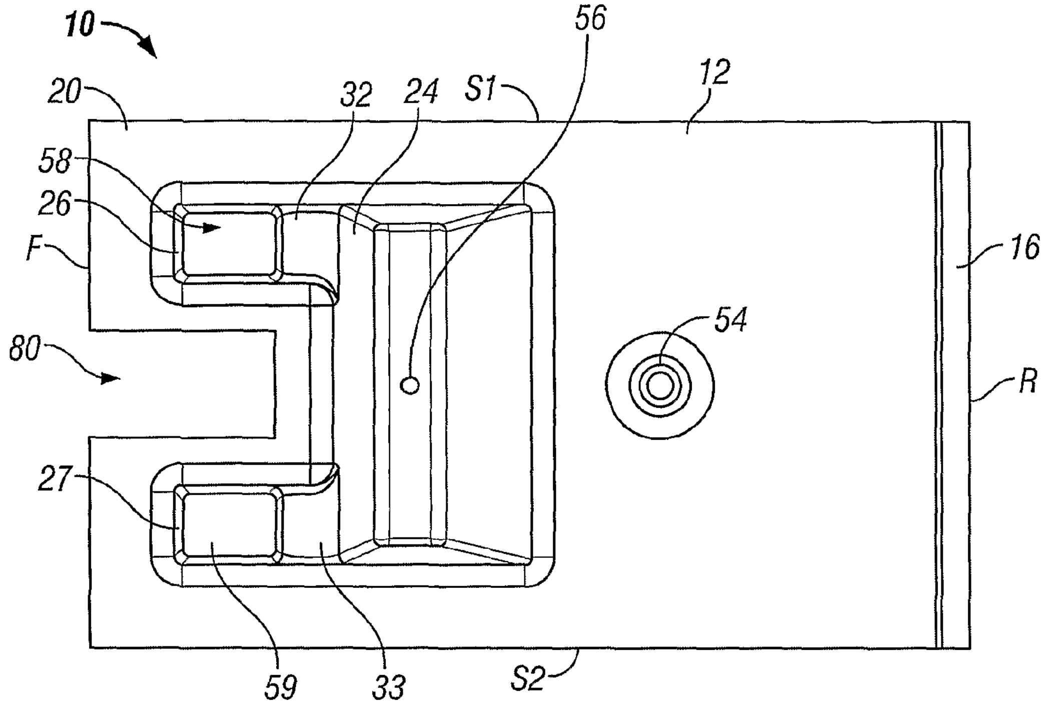

Turning now to FIG. 12, there is shown a plan view of the top of the cartridge-type dispenser 10 of FIGS. 10, 11. As is seen thereon, the first overflow weir 26 includes an overflow exit 58 permitting for any liquid overflowing the channel 32 from the supply weir 24 to exit downwardly through the exit 58. Similarly, there is depicted a second overflow weir 27 which includes an exit 59 at the base thereof. This second overflow weir 27 is similarly in fluid communication via the channel 33 with the supply weir 24. A recess 80 in the top 12 separating the first exit weir 26 from the second exit weir 27 is visible and while the depiction shows that the top surface of the cartridge-type dispenser is essentially symmetrical about a line parallel to the first side S1 and the second side S2 passing through a mid-point between these two sides, such illustrates a preferred embodiment, but is not a limiting feature of the present invention.

Figure 13:
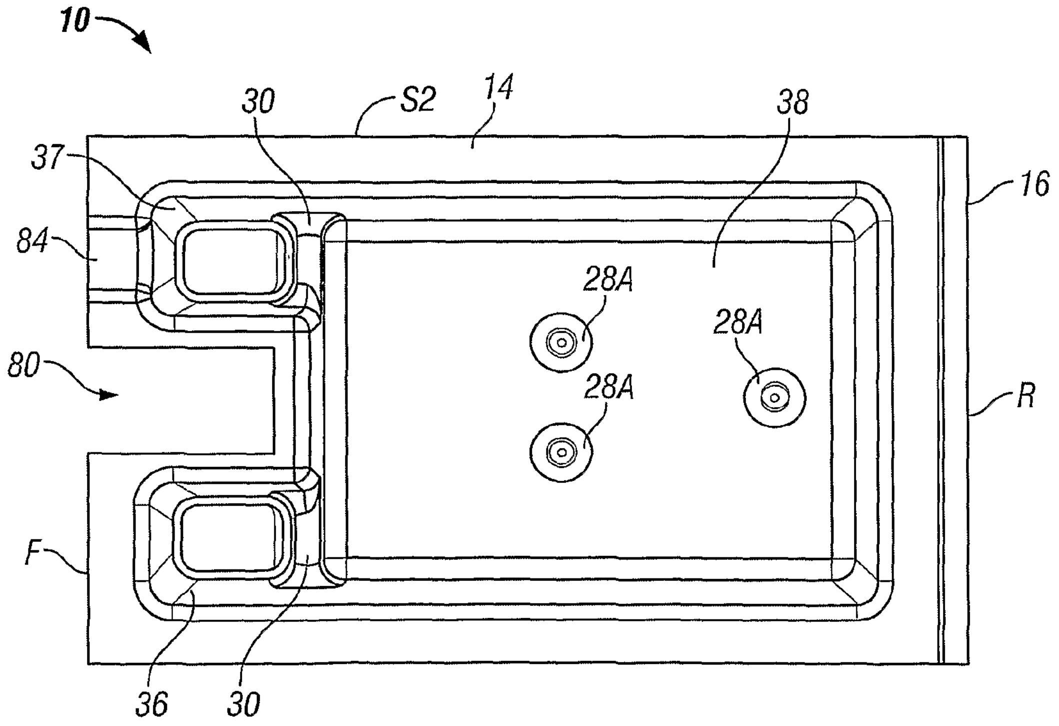

FIG. 13 depicts a plan view of the underside of the cartridge-type dispenser 10 described with reference to FIGS. 10-12. As is readily seen, a dike 30 separates the trough from the exit section 36 as well as the exit weir 37. Also visible are the retention posts 28A which extend upwardly from the base 38 into the interior of the trough (not shown).

Figure 14:
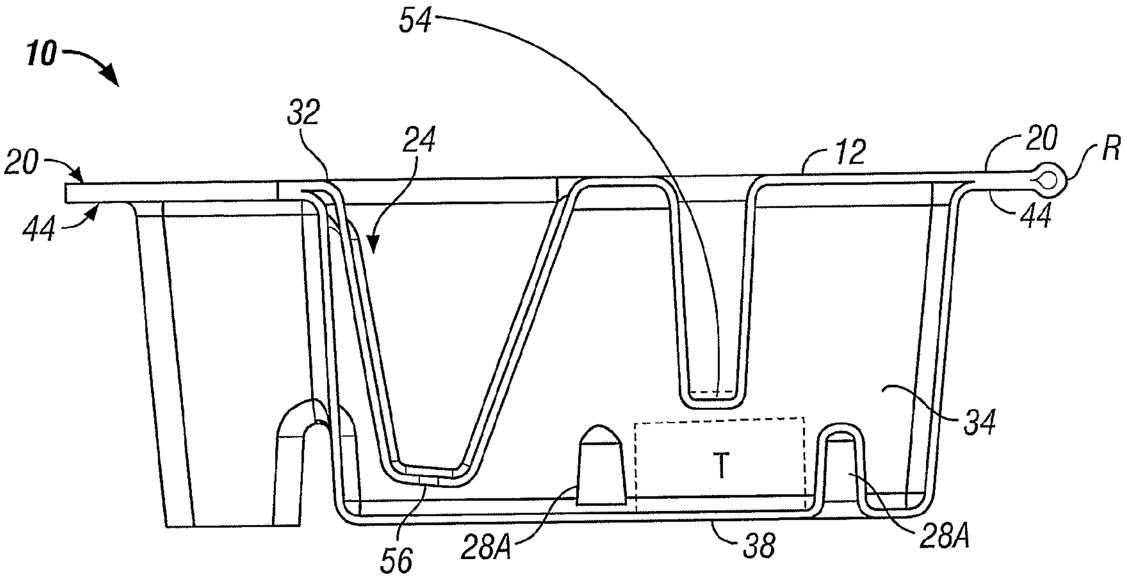

FIG. 14 illustrates a cross-section of the second embodiment of the cartridge-type dispenser 10 according the FIG. 10 as bisected by a plane passing midway between the first side S1 and the second side S2 thereof. As can be seen in the detail provided within FIG. 14, the cartridge-type dispenser 10 is formed with a top part 12 and a bottom part 14 which are conjoined at overlapping flanges 22, 44 having a liquid-type seal formed therebetween. Extending upwardly from the base 38 and into the interior or trough 34 are a plurality of retention posts 28A which are integrally formed with the base 38. Extending downwardly from the top 12 is a retention post 28 which in conjunction with the retention posts 28A is adapted to retain therebetween a treatment composition, here in the form of a tablet (depicted in phantom) T. Forward of the tablet T is a supply weir 24 integrally formed and extending downwardly from the top 12 having at its bottom a supply hole 56 through which a liquid present within the supply weir 24 may enter into the trough 34. Further, while not clearly depicted in this particular cross-sectional view, a channel 32 permits for excess liquid present in the supply weir 24 to pass and enter into an overflow weir 26.

Figure 15:
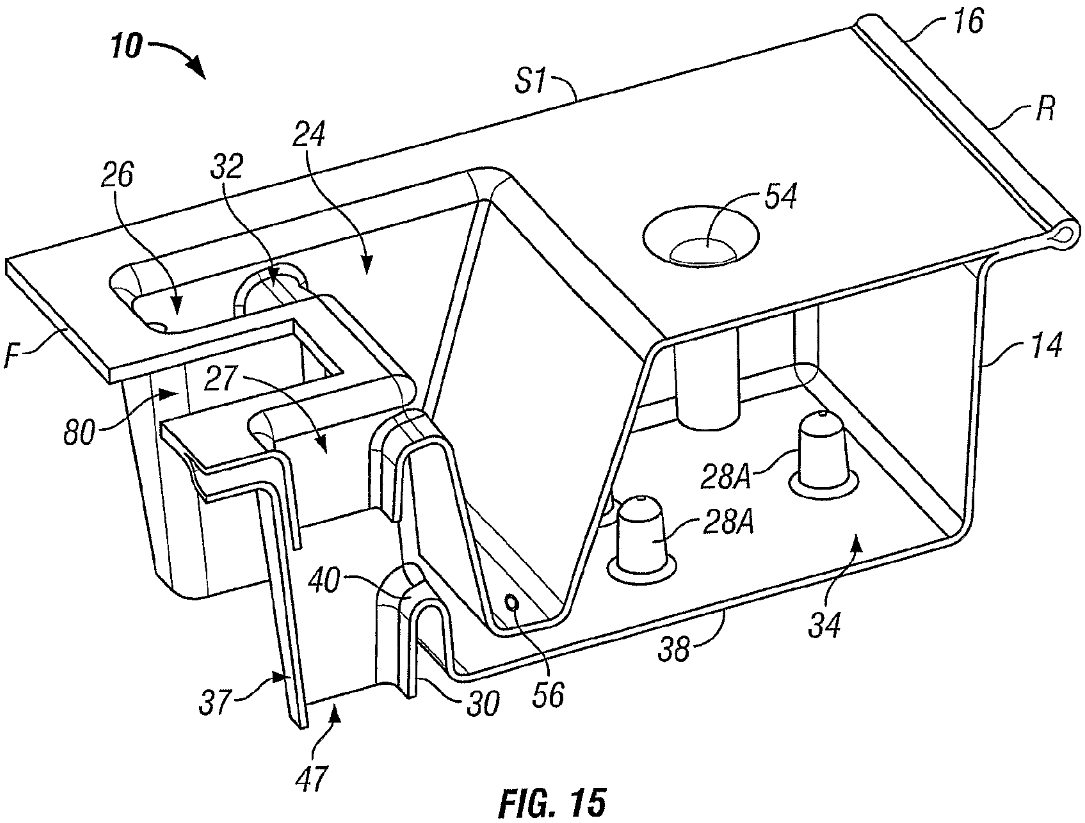

Turning now to FIG. 15, there is depicted a perspective cross-sectional view of the second embodiment of the cartridge-type dispenser 10 depicted and described with reference to FIGS. 10-14. In this particular embodiment, the cross-sectional view is at a plane which intersects the cartridge-type dispenser and bisects exit weir 37. With regard to the depiction, in this view a tablet T is omitted. As is nonetheless visible from the figure, the trough 34 is in fluid communication with the exit section 37 and its exit 47 whereby, liquid present within the trough 34 may pass over the crest 40 of the dike 30 and spill over into the exit section 37 and out through the exit 47. Similarly, any liquid present in the supply weir 24 in excess of its volumetric capacity can also flow over and through the channel 32 into one or both of exit weirs 26, 27 and flow downwardly and exit out from the cartridge-type dispenser 10.

Figure 16:
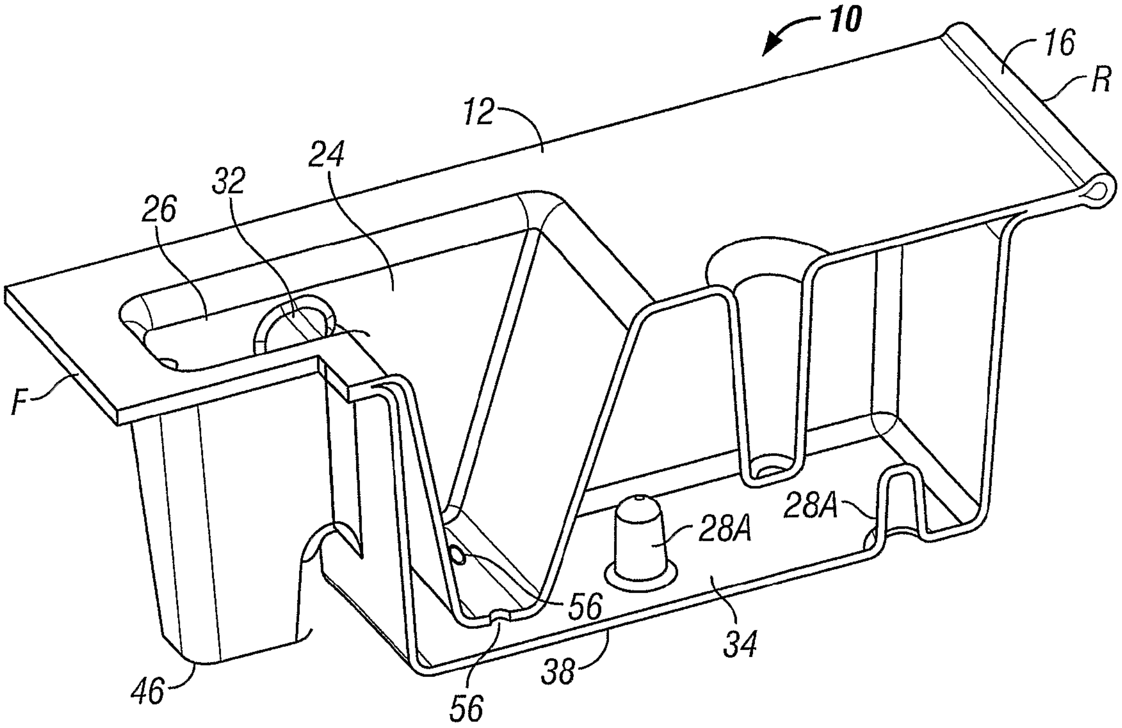

FIG. 16 illustrates in a perspective view a further cross-sectional view described with reference to FIG. 14. Again, in this FIG. 15, the tablet T has been omitted for sake of clarity as it has been omitted in the description regarding FIG. 15. As is better visible in this view, a plurality of supply holes 56 is present at the bottom of the supply weir 24 which permits for the fluid communication of liquid in the supply weir 24 into the trough 34. Again, any excess liquid present within the supply weir 24 may flow through the channel 32 connecting the upper portion of the supply weir 24 and overflow weir 26 wherein such excess liquid may flow downwardly and out of the cartridge-type dispenser 10 via the exit 46.

Figure 17:
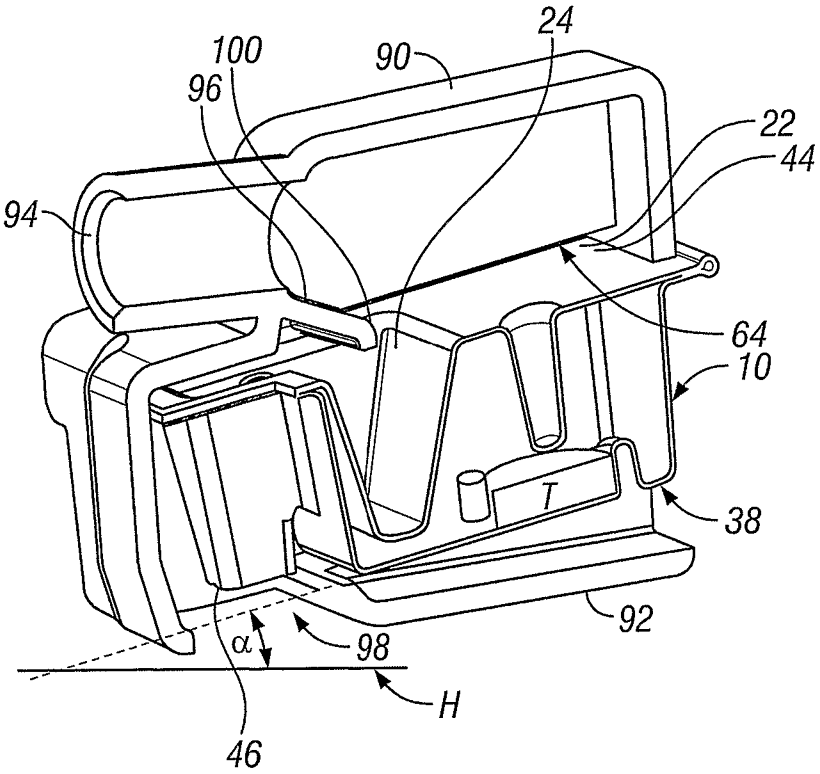

FIG. 17 illustrates an embodiment of a housing body 90 which is adapted to receive and retain therein a cartridge-type dispenser 10 according to the second embodiment of the invention. As is visible therein, in this cross-sectional view a portion of the upper and bottom flanges 22, 44 are slidably insertable via a recessed channel 64 present within the housing body 90. As is readily seen, the base 38 of the cartridge-type dispenser 10 is positioned at an incline with respect to the horizontal "H" wherein the angle between the horizontal H and the base 38, the angle "alpha" is desirably greater than 0°, it is desirably at least 2°, more preferably at least 4° with respect to the horizontal H. In this manner, a downward directional flow may be imparted wherein the housing body 90 is part of an apparatus, or is otherwise positioned so that its base 92 is essentially horizontal. The housing body 90 also includes an inlet port 94 which is above and upstream of the supply weir 24. In this embodiment, a generally cylindrical inlet port or bore is disclosed however, such is a convenient form, but is not a required form of the inlet port 94. The inlet port terminates in a spillway 96, here in the form of a generally flat, or arcuate downwardly sloping ramp terminating at an end 100 which directs liquid entering from the fluid port 94 into the supply weir 24. Thereafter, liquid supplied into the supply weir 24 enters into the interior of the cartridge-type dispenser 10 and operates in the manner described in the prior figures. The housing body 90 also includes a housing body exit 98 which is downstream of the cartridge-type dispenser 10 and is specially downstream of any liquid exits, here 46.

Figure 18:
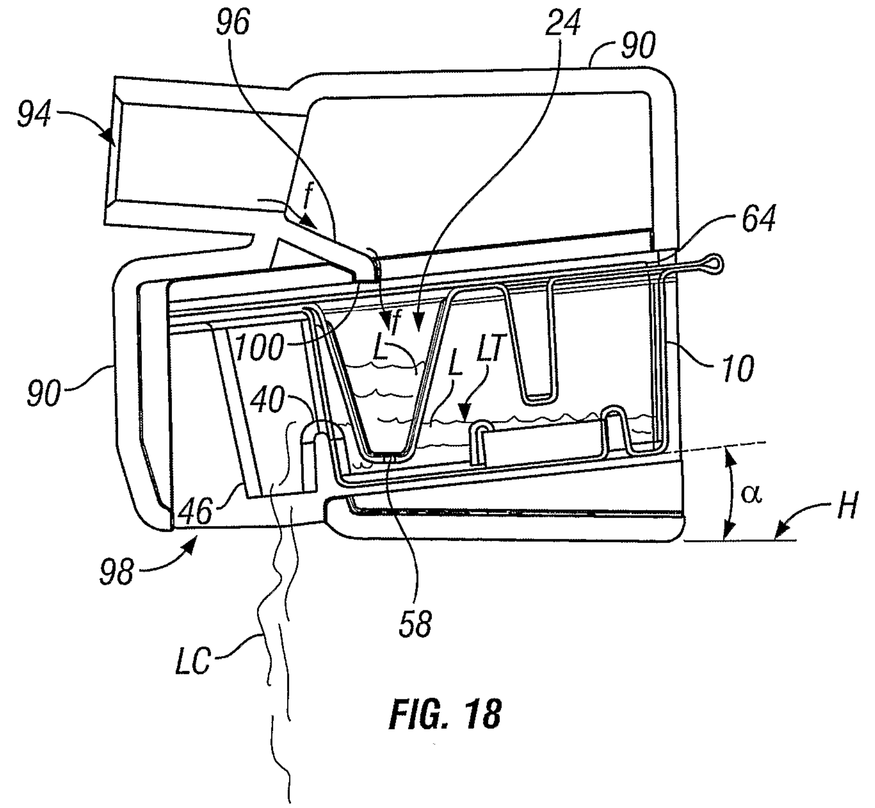

FIG. 18 shows a cross-sectional view of the housing body 90 of FIG. 17 containing therein a cartridge-type dispenser 10 according to the second embodiment of the invention. As is seen therein in greater detail is the relationship between the inlet port 94, the spillway 96, the housing body exit 98 and the cartridge-type dispenser 10. FIG. 18 depicts the cartridge-type dispenser 10 as being properly inserted. In this embodiment, any liquid (as indicted by flow directional arrows "f") flowing from the inlet port 94 pass down the spillway 96 past the end thereof 100, and into the supply weir 24. As can be seen, the cartridge-type dispenser is slightly inclined, at an angle "alpha" with respect to the horizontal "H" and as is depicted thereon, quality of liquid L is present both within the supply weir 24 as well as within the trough 34. The level of the liquid, that is to say the top of the liquid "LT" as depicted in this particular embodiment, is seen to be sufficiently high to both cover the tablet "T" as well as to rise above the crest 40 whereby liquid containing a quantity of the chemical composition which has been provided by the tablet T forms a liquid treatment composition LC which exits via the exit section 46 past the dispenser body exit 98 and is permitted to float downstream. This liquid treatment composition can be used either directly, or can be passed further downstream to a further part of the apparatus as is appropriate.

Figure 19:
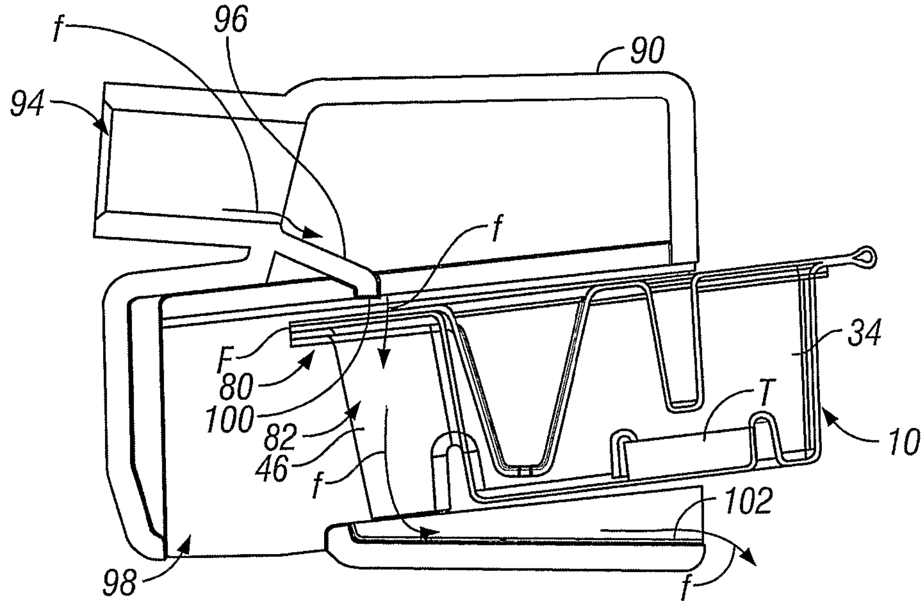
Figure 20:
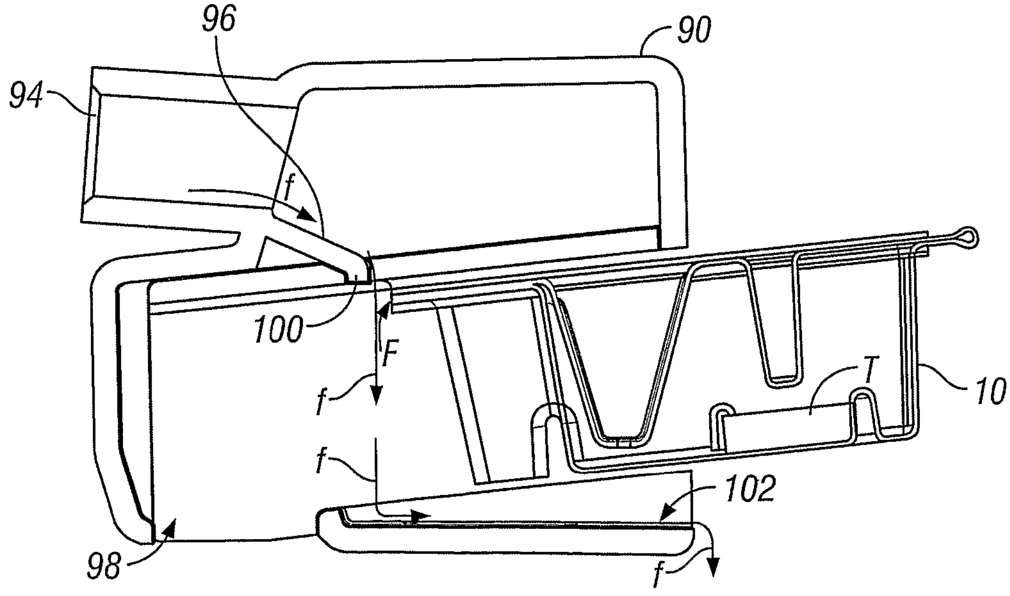

Certain advantageous features of the dispenser body 90 and the cartridge-type dispenser 10 depicted on FIG. 18 are described in further detail with respect to FIGS. 19 and 20.

Turning first to FIG. 19, there is depicted thereon a cartridge-type dispenser 10 which has only been partially inserted within the dispenser body 90. As can be seen, the front F of the cartridge-type dispenser 10 is positioned such that the end 100 of the spillway 96 is positioned above the recess 80 as well as above one or both of the overflow weirs. In this depiction, overflow weir 46 is disclosed; overflow weir may be present but is not visible in this cross-sectional view.

In operation, liquid entering the fluid inlet 94 passes down the face of the spillway 96 and falls beyond the end 100 thereof. This liquid is represented by directional arrows "f" in the figures. As can be seen, the liquid falls directly downwardly and either falls through the recess 80 and in the gap 82 and then onto a raceway 102 beneath the cartridge-type dispenser 100, and/or alternately, may fall through one or both of the exit weirs 46 (as well as 47) and thereupon onto the raceway 102. As will be understood with reference to the figure, liquid does not enter into the trough 34 of the cartridge-type dispenser 34 nor come into contact with the chemical composition, here depicted as a tablet T. Rather, the liquid falls onto the raceway 102 and in accordance with the depicted embodiment, the raceway is slightly tilted downwardly and away from the dispenser body exit 98. In such configuration, the liquid then rolls or spills outwardly from the dispenser type body and does not pass further downstream via the dispenser body exit 98.

Turning now to FIG. 20, there is depicted a still further arrangement of the dispenser body according to FIGS. 18 and 19 as well as the dispensing type cartridge 10. In the configuration depicted, the dispensing cartridge 10 is even further withdrawn away from the interior of the dispenser body 90 such that the front end F of the cartridge-type dispenser 10 does not extend beneath the spillway 96 or its front end 100 thereof. In the embodiment as depicted, liquid entering via the fluid inlet 94 passes onto the spillway 96 and falls downwardly over the end 100 thereof. As the cartridge-type dispenser 100 is retracted with respect to the dispenser body 90, this flow of liquid "f" falls directly downwardly without contacting any part of the dispenser cartridge 100 but flows directly by impinging onto the raceway 102. As is shown in the picture, directional arrows "f" indicate the direction of flow of this liquid. As is seen, the liquid is directed to flow outwardly and away from the dispenser body 90 and not further downstream by exiting via the dispenser body exit 98.

With respect to the embodiments of FIGS. 18, 19 and 20, it is of course to be understood that certain variations are clearly contemplated to fall within the scope of the invention.

First, it is contemplated that the angle of the base of the dispenser cartridge 10 does not necessarily need to be angled with respect to the horizontal, in such case the angle "α" may be zero, or for that matter may even be a negative angle with respect to the horizontal.

With regard to the dimensions of the raceway, it is contemplated that where it is desired that all liquid be reclaimed, irregardless of the proper or improper orientation or positioning of the cartridge-type dispenser 10 with respect to the dispenser body 90, that, the raceway may be altered so that it is tilted to direct any liquid flow "f" inwardly towards the dispenser body exit 98, and thereafter thus directing such liquid further downstream. It is also further contemplated that the relative size of the dispenser body exit 98 may be enlarged so as to reduce, or eliminate the need for a raceway 102 as depicted in FIGS. 18, 19 and 20.

It is also clearly contemplated that different embodiments of cartridge-type dispensers, including the first embodiment previously discussed, as well as the third embodiment to be discussed hereinafter may also so be utilized with the dispenser body disclosed in FIGS. 17-20 according to the present invention.

FIGS. 21, 22, 23, 24 illustrate a third, preferred embodiment of a cartridge-type dispenser 10 according to the present invention.

Figure 21:
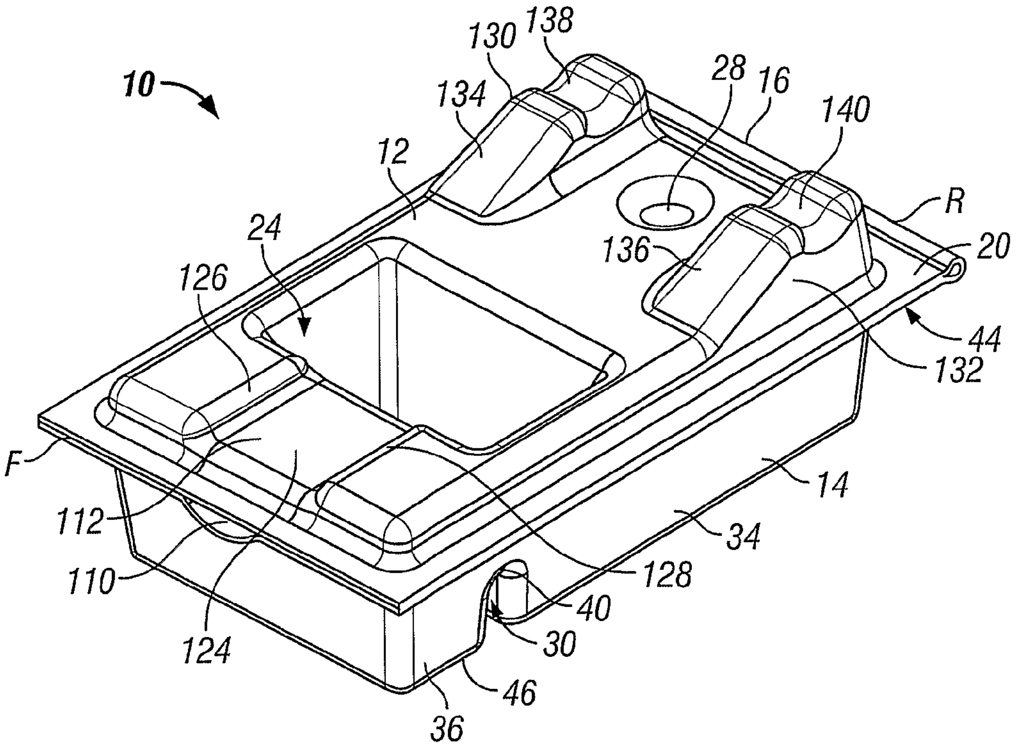

Turning now to FIG. 21, there is depicted a cartridge-type dispenser 10 which includes a top part 12 joined to a bottom part 14 via corresponding peripheral flanges 22, 44. The top portion is affixed to the second portion also by an intermediate hinge 16 positioned at the rear "R" of the cartridge-type dispenser 10. At the opposite end thereof, namely the front "F" and the cartridge-type dispenser 10 is provided intermediate a portion of the top flange 22 and the bottom flange 44 and overflow passage 110 which provides for fluid communication between the interior and the exterior of the cartridge-type dispenser 10. Moving from the front F towards the rear R of the cartridge-type dispenser there is provided an overflow channel 112 which is in fluid communication with a supply weir 24. The overflow channel has a crest portion 124 positioned between two side abutments 126 and 128 which are used to direct flow of any excess liquid present within the supply weir 24 between aforesaid abutments 126, 128 and through the overflow channel 112 outwardly and away from the cartridge-type dispenser 10. Still further rearwardly with respect to the front of the device, and between the supply weir 24 and the hinge 16 there are present a pair of spaced apart ramped support ridges 130, 132. Each of the aforesaid ramp ridges include a forwardly directed ramp portion 134, 136 which rise upward from the top surface of the cartridge-type dispenser 10 and which terminate in a corresponding detent, here an arcuate detent 138, 140 which is present on and forms a part of each of the ramped support ridges 130, 132. Also visible in the figure, is indicated a retention post 28 which extends downwardly from the top surface of the cartridge-type dispenser 10 and although not shown, extends inwardly into the interior thereof.

With respect now to the bottom of the cartridge-type dispenser 10 of FIG. 21, there is visible a single exit section 36 which has at its bottom end thereof (not visible in the figure) an exit 46. Rearward of the exit section 36 is positioned a dike 30 having a crest 40 which separates the rearward or trough 34 of the bottom part of the cartridge-type dispenser from the exit section 36.

Figure 22:
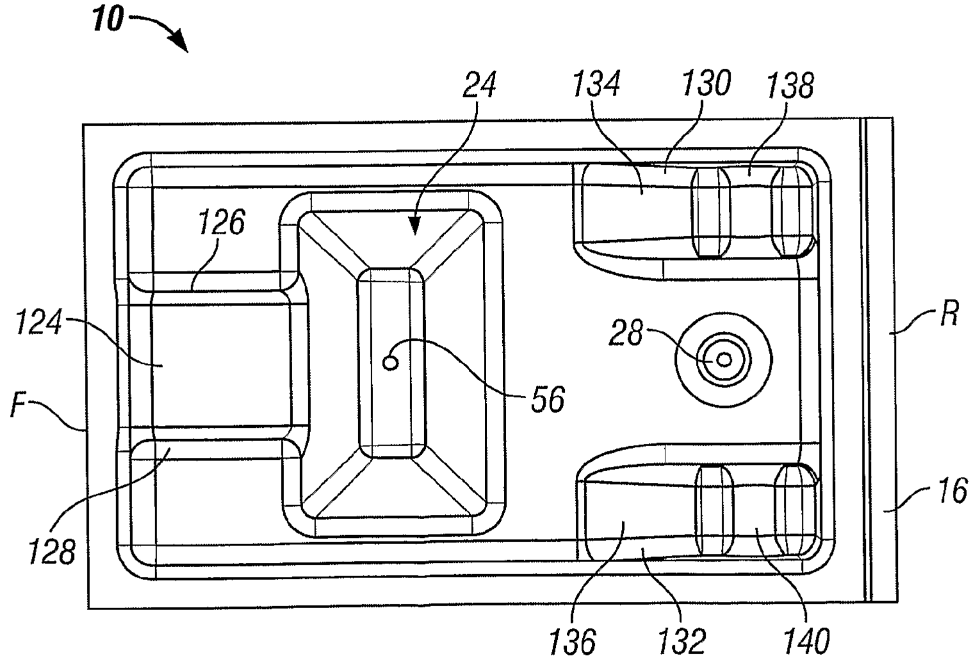

Turning now to FIG. 22, there is depicted a top plan view of the cartridge-type dispenser according to FIG. 21. As is visible thereon, the supply weir 24 has at its bottom a supply hole 56 which permits for liquid present within the supply weir 24 to pass into the interior of the cartridge-type dispenser 10.

Figure 23:
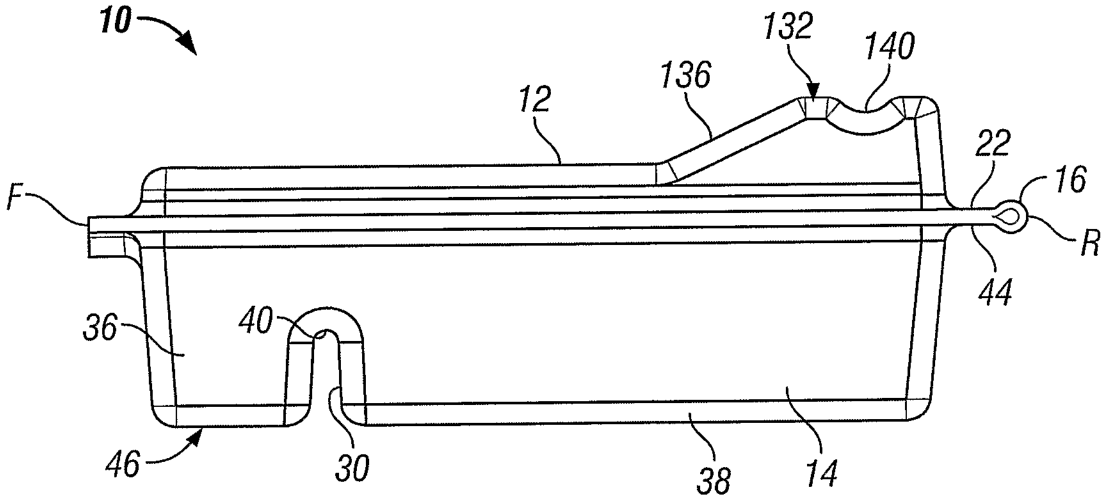

Turning now to FIG. 23, there is depicted a side, plan view of the cartridge-type dispenser 10 according the FIGS. 21, 22. As is visible thereon, the top part 12 and the bottom part 14 of the cartridge-type dispenser 10 are sealed together in a liquid tight bond at their appropriate flanges 22, 44 which extend about the periphery of the cartridge-type dispenser 10.

Figure 24:
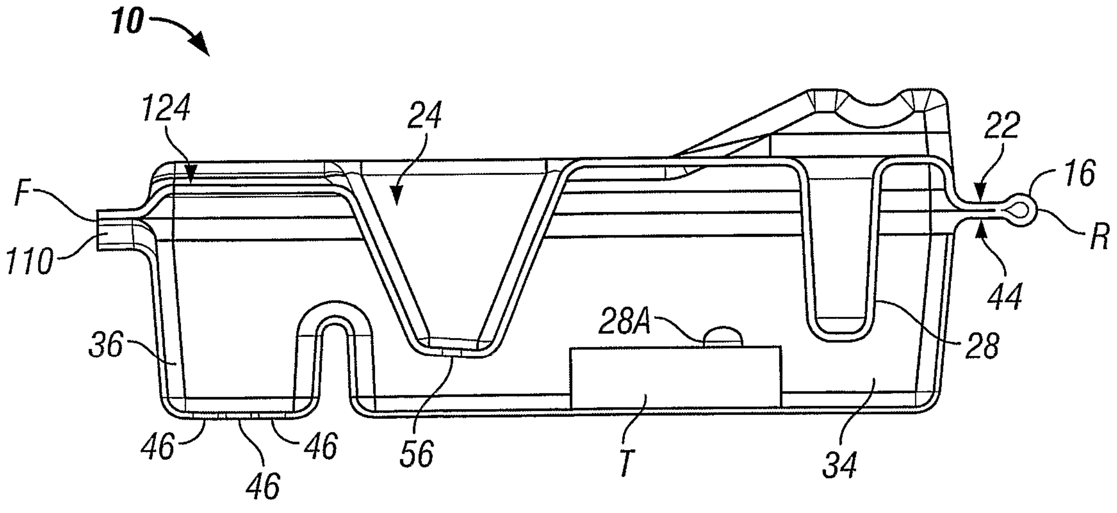

FIG. 24 illustrates across-sectional view of the cartridge-type dispenser according to FIGS. 21, 22. The cross-sectional view depicted on FIG. 24 is in accordance with the plane bisecting the cartridge according to FIG. 23 and parallel thereto. As is better seen in FIG. 24, the interior of the cartridge-type dispenser 10 more clearly depicts the arrangements of the various elements forming a part thereof. Moving from the front F towards the rear R is first to be noted that the exit 46 of the exit section 36 is actually provided by a plurality of spaced apart perforations, here circular holes which pass through the material of construction making up the bottom of the cartridge-type dispenser 10. These perforations forming the exit 46 are positioned at the base of the exit section 36. The bottom of the supply weir 24 terminates in a supply hole 56 which provides for liquid to pass from the interior of the supply weir 24 and into the interior of the trough 34 of the cartridge-type dispenser 10. In this embodiment, the chemical treatment composition is depicted as provided in the form of a compressed tablet "T" as depicted. Rearward of both the supply weir 24 and the cartridge-type dispenser T is a retaining post 28 which extends downwardly from the top, of the cartridge-type dispenser and into the interior thereof. In this particular embodiment, such a retaining post 28 is optional albeit, may be retained particularly where tablets of larger dimensions are contemplated to be use, and/or the tablet is intended to be positioned between a retaining post 28A (partially visible) and beneath the retaining post 28. As is further visible in the figure, the overflow channel 124 is in fluid communication with one edge of the supply weir 24 and extends towards the front of the cartridge-type dispenser 10. Finally, there is visible the interior of the overflow conduit 110 positioned between a part of the upper flange 20 and the bottom flange 44 in providing for fluid communication into the interior of the cartridge-type dispenser 10. The third embodiment of the cartridge-type dispenser according to FIGS. 21-24 are advantageously used with a dispenser body as described with reference to FIGS. 25-27. The embodiment depicted in these figures illustrates a third preferred embodiment of a dispenser body 150 according to the present invention.

Figure 25:
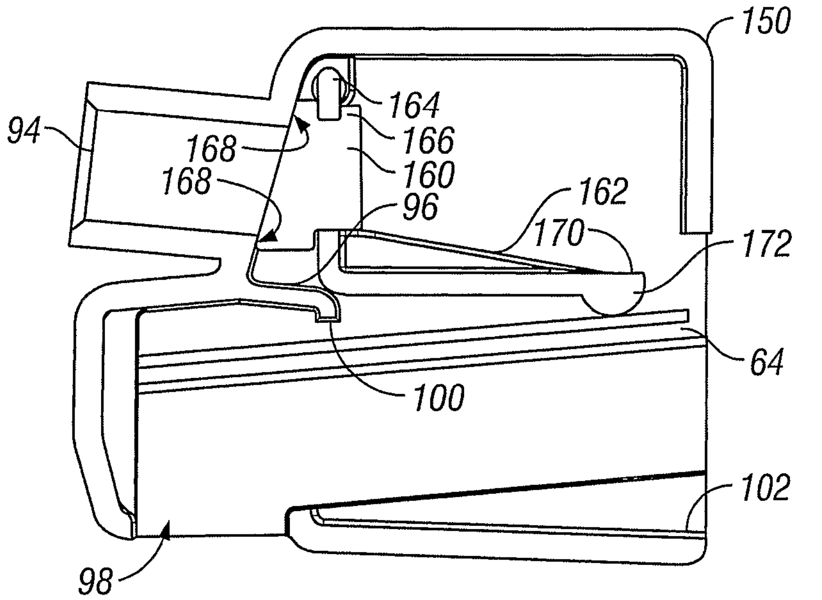

With reference now to FIG. 25 as is seen thereon, the dispenser body 150 includes a liquid inlet 94 which is a bore passing from the interior and into the interior of the dispenser body 150. The dispenser body in the embodiment depicted includes a valve 160 mounted upon a cantilever arm 162 having one end a pivot 164 which is inserted into a corresponding retainer or hole (not shown) within the dispenser body 150. Adjacent to the pivot end 164 is the valve 160 which advantageously includes at least a part 166 which is resilient and which can be used to form a liquid tight seal by abutting a portion thereof against end 168 of the bore 94. The cantilever arm 162 has at its terminal end 170 a curved end 172 and the mass of the cantilever arm 162 and its position with respect to the valve 160 and the pivot end 164 is such that, when a cartridge-type dispenser 10 according to the invention is absent from the interior of the dispenser body 150, or is insufficiently inserted within the interior of the dispenser body, the mass of the cantilever arm 162 is sufficient such that the valve 160 is urged against the end 168 of the bore and to provide a liquid tight seal therewith. In this manner, liquid flow from the bore 94 into the interior of the dispenser body 150 is denied until a suitably dimensioned dispenser cartridge 10 according to the invention is properly inserted within the dispenser body 150.

The dispenser body further includes a spillway 96 beyond the bore end 168 with the spillway 96 having an end 100 over which liquid exiting the bore 94 may flow. Also present within the dispenser body 150 are a pair of spaced apart channels 64 which are suitably dimensioned to accommodate a portion of the flanges of the cartridge-type dispenser 10 which is insertable therein. Further present, is a raceway 102 and a container body exit 98.

It is to be pointed out that the arrangement of the spillway 96 and its end 100 with respect to the dimensions of the dispenser body exit 98 and the raceway 102 are approximately the same as that as depicted in prior FIGS. 19 and 20. It is to be clearly understood that the end 100 of the spillway 96 overlaps and extends over the spillway 102. However, as discussed previously, this is not necessary nor is to be construed as a limiting factor of the present invention and other configurations are clearly contemplated as falling within the scope of the present invention.

Figure 26:
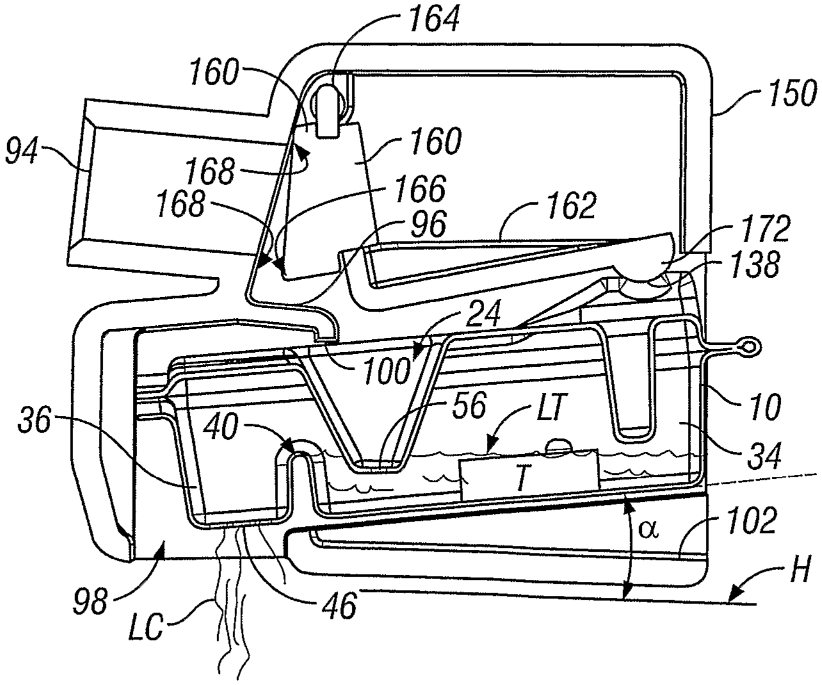

The operation and the interaction of the dispenser body 150 and the cartridge-type dispenser 10 according to the third embodiment of the invention is described and disclosed in better detail with regard to FIG. 26. As is therein clearly visible, the properly inserted cartridge-type dispenser 10 is inserted within the channel 64 such that the cantilever arm 162 is urged upwardly and away from the top of the cartridge-type dispenser 10 and additionally, wherein the curved end 172 rests within the arcuate detents 138, (not visible) 140. This arrangement urges the valve 160 to be retracted whereby liquid may flow from within the bore 94 onto the spillway 96 past the end thereof and into the supply weir 24. Thereafter, liquid may enter via the supply hole 56 into the trough 34 and come into contact with the chemical composition of the tablet T. The top surface or top level of the liquid "LT" extends from the rear of the cartridge to the crest 40. The liquid, in which a part of the chemical composition dispersed, dissolved, or otherwise eluted into the liquid forms a treatment liquid composition "LC" which can then flow over the crest 40 downwardly into the exit section 36 and downstream via the exit, 46, here one of more of a plurality of holes provided for that function.

Again, as has been discussed with reference to prior figures, the position of the base 38 of the cartridge-type dispenser 10 is positioned at an angle "alpha" which is greater than zero with respect to the horizontal "H". However, this is not essential, albeit does represent a preferred embodiment of the invention.

Figure 27:
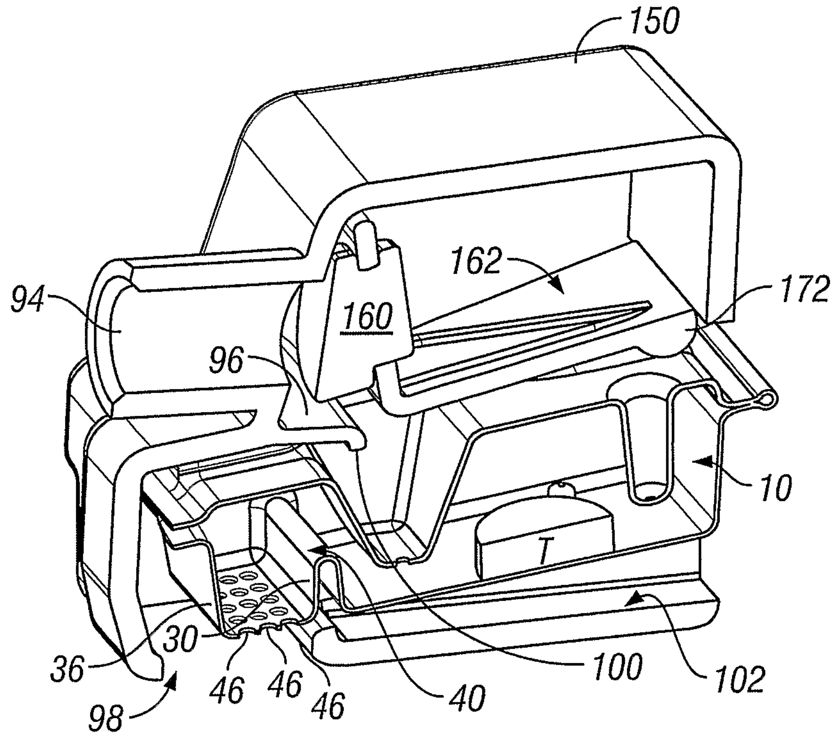

FIG. 27 depicts in perspective view, the embodiment according to the figure represented in FIG. 26. As can be seen from this perspective, cross-sectional embodiment, the various interrelationship of the specific elements discussed with reference to FIG. 26 are more clearly illustrated. Particularly, it is also readily seen that the exit 46 of the cartridge-type dispenser 10 is comprised of a plurality of spaced apart perforations or holes which pass through a portion of the bottom of the cartridge-type dispenser 10.

While the foregoing figures illustrate certain preferred embodiments of the invention, it is nonetheless to be understood that many variations to the above embodiments may be made by a skilled artisan and such are considered to fall within the scope of the present invention. By way of non-limiting example such variations include: providing a screen or filter as a part of the top of the cartridge-type dispenser; providing a screen or filter in the supply weir of the cartridge-type dispenser; providing a single, or more than two ramped support ridges. Other obvious modifications may incorporated into the design or use of the cartridge-type dispensers of the invention as well as housings therefore and uses thereof and are considered to be part of the present invention.

While the cartridge-type dispenser may be made of any material, the use of non-porous materials such as metals, metallic foils, glass, ceramics, or thermosettable or thermoformable synthetic polymers such as are widely used in casting or injection molding may be used. The use of thermosetting polymers are particularly preferred as they are readily available and are easily formed into the cartridge-type dispensers by known techniques, including injection molding and vacuum molding.

The interior surfaces of the cartridge-type dispensers may be provided with a hydrophobic coating when water is to be used as the liquid, or with a hydrophilic coating when other liquids are to be used.

The cartridge-type dispensers of the invention include a chemical treatment composition, most conveniently present in the form of a gel, tablet or block.

The chemical treatment composition of the invention may by any composition or material which is at least partially soluble or dispersible in a liquid, e.g., water, non-aqueous liquid or mixture thereof which contacts the chemical treatment composition. It is to be understood that the chemical treatment composition need not be completely soluble or dispersible, rather it being sufficient that only a part is soluble in the liquid being supplied to the cartridge-type dispenser. The dissolution conditions, e.g., temperature, or rate of dissolution is not a limiting factor of the present invention and it is contemplated that the improved cartridge-type dispenser may be used with very poorly soluble materials, as well as very highly soluble materials as well.

The chemical treatment composition of the invention may be in the form of tablets and blocks useful in eluting one or more chemical compositions and which is useful with the cartridge-type dispenser described herein may be of any configuration or geometry; e.g., including but not limited to circular tablets, spheres, elliptical or oval shaped tablets, square, rectangular, parallelogram as well as cube shaped and brick shaped tablets. Also useful as tablets or blocks useful with the present inventions are configurations such as rods and rectangular plates which are at least twice as long as they are wide.

The chemical treatment composition of the invention may be it the form of a thickened past, or may be in the form of a gel, or indeed the chemical treatment composition may be a liquid composition provided in a carrier, such as a in a further container suitably dimensioned to fit within the interior of the trough of the cartridge-type dispenser. Such a liquid may be in a container which is made completely of, or alternately may be partially of a membrane material present within a wall portion of the container. In such an embodiment, liquid entering the cartridge-type dispenser contacts the membrane through which the liquid composition may elute into the liquid contained within the cartridge-type dispenser prior to flowing out from the said dispenser. Alternately the liquid of a chemical treatment composition may be absorbed or adsorbed onto a carrier substrate, such as in the form of a disperse matrix present in a continuous matrix wherein the latter is soluble in the liquid being supplied to the cartridge-type dispenser. In such an embodiment, as the continuous matrix is dispersed or dissolved, the particles of the disperse matrix are disposed and thereby release the chemical treatment composition to the liquid contacting the disperse matrix. Alternately the particles of the disperse matrix are merely physically entrained in the liquid but are not necessarily soluble or dispersible within the liquid.

It is contemplated that virtually any material may be used as the chemical treatment composition according to the invention.

By way of non-limiting examples the chemical treatment composition may comprise one or more the following: surfactants including one or more of anionic, cationic, nonionic, amphoteric and zwitterionic surfactants, disinfectants, sanitizing agents or compositions, coloring agents such as dyestuffs and pigments, fragrances, organic and inorganic salts particularly as may be useful in the treatment of water, such as hard water, enzymes, anti-corrosion agents, as well as others materials which may be useful in providing a benefit.

In certain embodiments the chemical treatment composition may comprise one or more of a pesticide, fungicide, insecticide, nematocide or herbicide.

In further embodiments the chemical treatment composition may comprise at least one pharmaceutically active constituent.

Advantageously wherein a disinfecting or sanitizing benefit is to be provided, the chemical treatment compositions comprise one or more known art sanitizers, such as alkali metal and alkaline earth metal hypochlorites, substituted and un-substituted chlorinated hydantoins, substituted and unsubstituted chlorinated isocyanurates and isocyanuric acids, substituted and unsubstituted chlorinated glycolurils, substituted and un-substituted chlorinated oxazolidinones and imidazolidinones and like chlorinated substances. Further exemplary sanitizing compositions are materials which provide hypohalous acid, HOX or hypohalite ion, $OX^-$ species wherein X is halogen when dissolved in water. The halogen source may comprise any halogen or a combination thereof; chlorine and bromine ions are particularly useful. Representative sanitizing compositions which provide hypohalous acid sources include, inter alia, trichloroisocyanuric acid (TCCA), dichloroisocyanuric acid (DCCA), monochloroisocyanuric acid, potassium dichloroisocyanuric acid, sodium dichloroisocyanuric acid dihydrate, anhydrous sodium dichloroisocyanuric acid, tribromoisocyanuric acid, dibromoisocyanuric acid, monobromoisocyanuric acid, monobromo-dichlorochloroisocyanuric acid, dibromo-monochloroisocyanuric acid, calcium hypochlorite, lithium hypochlorite, 1,3-dichloro-5,5-dimethylhydantoin (DCDMH), 1,3-dibromo 5,5-dimethylhydantoin, 1-bromo, 3-chloro-5,5-dimethyhydantoin (BCDMH), 1,3-dichloro-5-methyl-5-ethylhydantoin, 1,3-dichloro-5,5-dimethyl-hydantoin, and the like.

Yet other devices which may incorporate the dispenser according to the invention, although not described with particularly within are also considered to be useful and falling into the scope of the invention.

It is to be understood that these examples are provided by way of illustration only and that further useful formulations falling within the scope of the present invention and the claims may be readily produced by one skilled in the art without deviating from the scope and spirit of the invention.

The invention claimed is:

1. A cartridge-type dispenser for a chemical treatment composition for eluting one or more chemical compounds via dissolution or dispersion of said chemical compound contained in said dispenser when contacted with water or other liquid to form a liquid treatment composition therefrom, the said dispenser including:

a top part joined to a bottom part, wherein the top part includes a supply weir having a supply hole, and wherein the supply weir is in fluid communication via an overflow channel with an overflow weir;

the bottom part includes a base having upwardly extending therefrom a dike which extends across the base and divides the base into a trough section and an exit section which exit section comprises an exit; and, a chemical composition contained in the trough section.

2. A cartridge-type dispenser according to claim 1 wherein the top part further includes a retention post which extends into the bottom part.

3. A cartridge-type dispenser according to claim 1 wherein the chemical composition contained in the trough section is in the form of solid, gel, semi-solid or paste composition.

4. A cartridge-type dispenser according claim 3 wherein the chemical composition is in the form of a tablet.

5. A cartridge-type dispenser according to claim 1 wherein the chemical composition is at least partially dissolvable or dispersible in a liquid entering the cartridge-type dispenser.

* * * * *